United States Patent
Aranami et al.

(10) Patent No.: US 11,462,722 B2
(45) Date of Patent: Oct. 4, 2022

(54) APPARATUSES AND PROCESSES FOR FORMING A SEMI-SOLID ELECTRODE HAVING HIGH ACTIVE SOLIDS LOADING AND ELECTROCHEMICAL CELLS INCLUDING THE SAME

(71) Applicants: 24M Technologies, Inc., Cambridge, MA (US); Kyocera Corporation, Kyoto (JP)

(72) Inventors: Junji Aranami, Otsu (JP); Raymond Zagars, Quincy, MA (US); Naoki Ota, Lexington, MA (US); Junzheng Chen, Concord, MA (US); Ricardo Bazzarella, Woburn, MA (US)

(73) Assignees: 24M Technologies, Inc., Cambridge, MA (US); Kyocera Corporation, Kyoto (JP)

( * ) Notice: Subject to any disclaimer, the term of this patent is extended or adjusted under 35 U.S.C. 154(b) by 67 days.

(21) Appl. No.: 17/152,950

(22) Filed: Jan. 20, 2021

(65) Prior Publication Data
US 2021/0226192 A1 Jul. 22, 2021

Related U.S. Application Data

(60) Provisional application No. 62/963,908, filed on Jan. 21, 2020.

(51) Int. Cl.
*H01M 4/04* (2006.01)
(52) U.S. Cl.
CPC ................ *H01M 4/0433* (2013.01)

(58) Field of Classification Search
CPC .................... H01M 4/0433; H01M 4/0435
See application file for complete search history.

(56) References Cited

U.S. PATENT DOCUMENTS

| 8,722,226 B2 | 5/2014 | Chiang et al. |
| 8,722,227 B2 | 5/2014 | Chiang et al. |

(Continued)

OTHER PUBLICATIONS

International Search Report and Written Opinion for International Application No. PCT/US2021/014175 dated May 17, 2021, 13 pages.

*Primary Examiner* — Austin Murata
(74) *Attorney, Agent, or Firm* — Cooley LLP

(57) ABSTRACT

Embodiments described herein relate generally to apparatuses and processes for forming semi-solid electrodes having high active solids loading by removing excess electrolyte. In some embodiments, the semi-solid electrode material can be formed by mixing an active material and, optionally, a conductive material in a liquid electrolyte to form a suspension. In some embodiments, the semi-solid electrode material can be disposed onto a current collector to form an intermediate electrode. In some embodiments, the semi-solid electrode material can have a first composition in which the ratio of electrolyte to active material is between about 10:1 and about 1:1. In some embodiments, a method for converting the semi-solid electrode material from the first composition into the second composition includes removing a portion of the electrolyte from the semi-solid electrode material. In some embodiments, the method includes mechanically compressing the intermediate electrode to remove the portion of electrolyte from the semi-solid electrode material.

30 Claims, 6 Drawing Sheets

(56) References Cited

U.S. PATENT DOCUMENTS

| | | |
|---|---|---|
| 8,778,552 B2 | 7/2014 | Chiang et al. |
| 8,993,159 B2 | 3/2015 | Chiang et al. |
| 9,153,833 B2 | 10/2015 | Chiang et al. |
| 9,178,200 B2 | 11/2015 | Bazzarella et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,411,310 B2 | 9/2019 | Chiang et al. |
| 10,483,582 B2 | 11/2019 | Chiang et al. |
| 10,497,935 B2 | 12/2019 | Ota et al. |
| 10,522,870 B2 | 12/2019 | Tan et al. |
| 10,566,581 B2 | 2/2020 | Bazzarella et al. |
| 10,566,603 B2 | 2/2020 | Slocum et al. |
| 10,593,952 B2 | 3/2020 | Ota et al. |
| 10,601,239 B2 | 3/2020 | Taylor et al. |
| 10,637,038 B2 | 4/2020 | Zagars et al. |
| 10,734,672 B2 | 8/2020 | Chen et al. |
| 10,777,852 B2 | 9/2020 | Woodford et al. |
| 10,854,869 B2 | 12/2020 | Bazzarella et al. |
| 10,886,521 B2 | 1/2021 | Zagars et al. |
| 10,910,858 B2 | 2/2021 | Taylor et al. |
| 10,957,940 B2 | 3/2021 | Tan et al. |
| 10,964,973 B2 | 3/2021 | Tan et al. |
| 11,005,087 B2 | 5/2021 | Ota et al. |
| 11,018,365 B2 | 5/2021 | Chiang et al. |
| 11,024,903 B2 | 6/2021 | Ota et al. |
| 11,094,487 B2 | 8/2021 | Lawrence et al. |
| 11,094,976 B2 | 8/2021 | Chiang et al. |
| 11,121,437 B2 | 9/2021 | Bazzarella et al. |
| 11,139,467 B2 | 10/2021 | Zagars et al. |
| 11,145,909 B2 | 10/2021 | Chiang et al. |
| 2010/0047671 A1 | 2/2010 | Chiang et al. |
| 2010/0323264 A1 | 12/2010 | Chiang et al. |
| 2011/0189520 A1 | 8/2011 | Carter et al. |
| 2011/0200848 A1 | 8/2011 | Chiang et al. |
| 2011/0274948 A1 | 11/2011 | Duduta et al. |
| 2012/0164499 A1 | 6/2012 | Chiang et al. |
| 2013/0055559 A1 | 3/2013 | Slocum et al. |
| 2013/0065122 A1 | 3/2013 | Chiang et al. |
| 2013/0309547 A1 | 11/2013 | Bazzarella et al. |
| 2013/0337319 A1 | 12/2013 | Doherty et al. |
| 2014/0004437 A1 | 1/2014 | Slocum et al. |
| 2014/0030623 A1 | 1/2014 | Chiang et al. |
| 2014/0039710 A1 | 2/2014 | Carter et al. |
| 2014/0154546 A1 | 6/2014 | Carter et al. |
| 2014/0170524 A1 | 6/2014 | Chiang et al. |
| 2014/0248521 A1 | 9/2014 | Chiang et al. |
| 2014/0315097 A1 | 10/2014 | Tan et al. |
| 2015/0024279 A1 | 1/2015 | Tan et al. |
| 2015/0129081 A1 | 5/2015 | Chiang et al. |
| 2015/0140371 A1 | 5/2015 | Slocum et al. |
| 2015/0171406 A1 | 6/2015 | Bazzarella et al. |
| 2015/0280267 A1 | 10/2015 | Chiang et al. |
| 2015/0295272 A1 | 10/2015 | Chiang et al. |
| 2015/0357626 A1* | 12/2015 | Holman ............ H01M 4/36 264/49 |
| 2016/0013507 A1 | 1/2016 | Chiang et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1* | 5/2016 | Zagars ............ H01M 4/0407 429/162 |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0308218 A1 | 10/2016 | Ota et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1* | 1/2017 | Tan ............ H01M 10/0568 |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0162863 A1 | 6/2017 | Doherty et al. |
| 2017/0214034 A1 | 7/2017 | Ota et al. |
| 2017/0237111 A1 | 8/2017 | Holman et al. |
| 2017/0237112 A1 | 8/2017 | Holman et al. |
| 2017/0288281 A1 | 10/2017 | Chiang et al. |
| 2018/0034090 A1 | 2/2018 | Chiang et al. |
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0006721 A1 | 1/2019 | Aruna et al. |
| 2019/0036101 A1 | 1/2019 | Tyler et al. |
| 2019/0058184 A1 | 2/2019 | Bazzarella et al. |
| 2019/0245242 A1 | 8/2019 | Tan et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0161688 A1 | 5/2020 | Chaing et al. |
| 2020/0220118 A1 | 7/2020 | Bazzarella et al. |
| 2020/0220204 A1 | 7/2020 | Tan et al. |
| 2020/0259338 A1 | 8/2020 | Taylor et al. |
| 2020/0321597 A1 | 10/2020 | Zagars et al. |
| 2020/0321601 A1 | 10/2020 | Slocum et al. |
| 2020/0358129 A1 | 11/2020 | Chen et al. |
| 2020/0411825 A1 | 12/2020 | Bazzarella et al. |
| 2021/0091366 A1 | 3/2021 | Bazzarella et al. |
| 2021/0249695 A1 | 8/2021 | Aranami et al. |
| 2021/0265631 A1 | 8/2021 | Chen et al. |
| 2021/0384516 A1 | 12/2021 | Lawrence et al. |

* cited by examiner

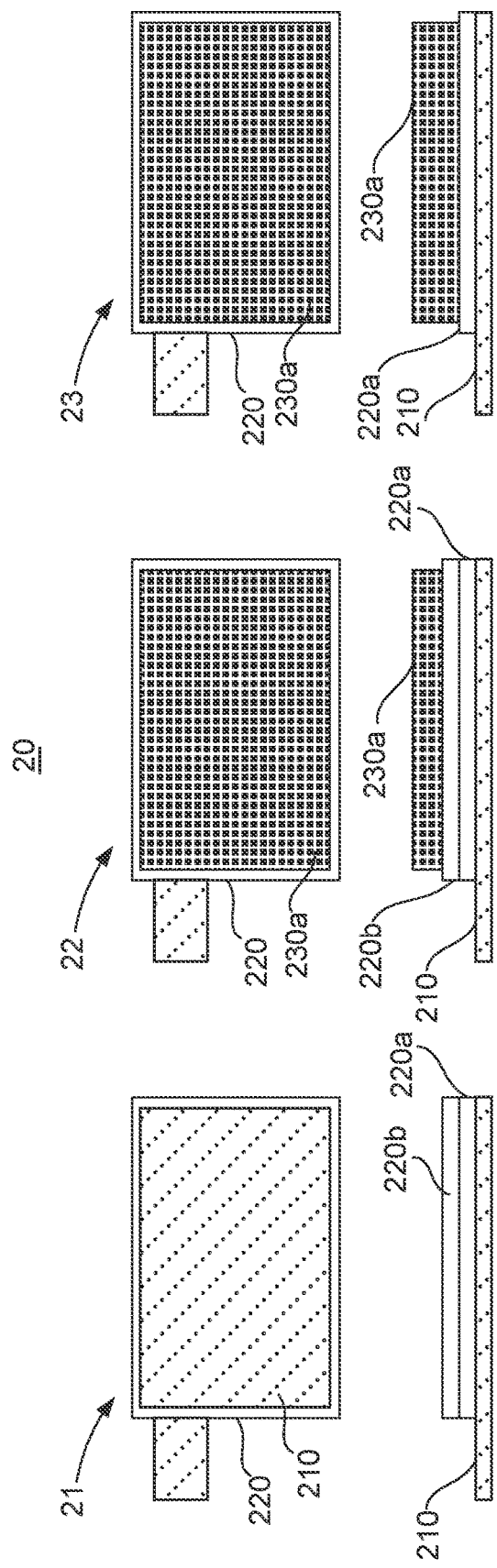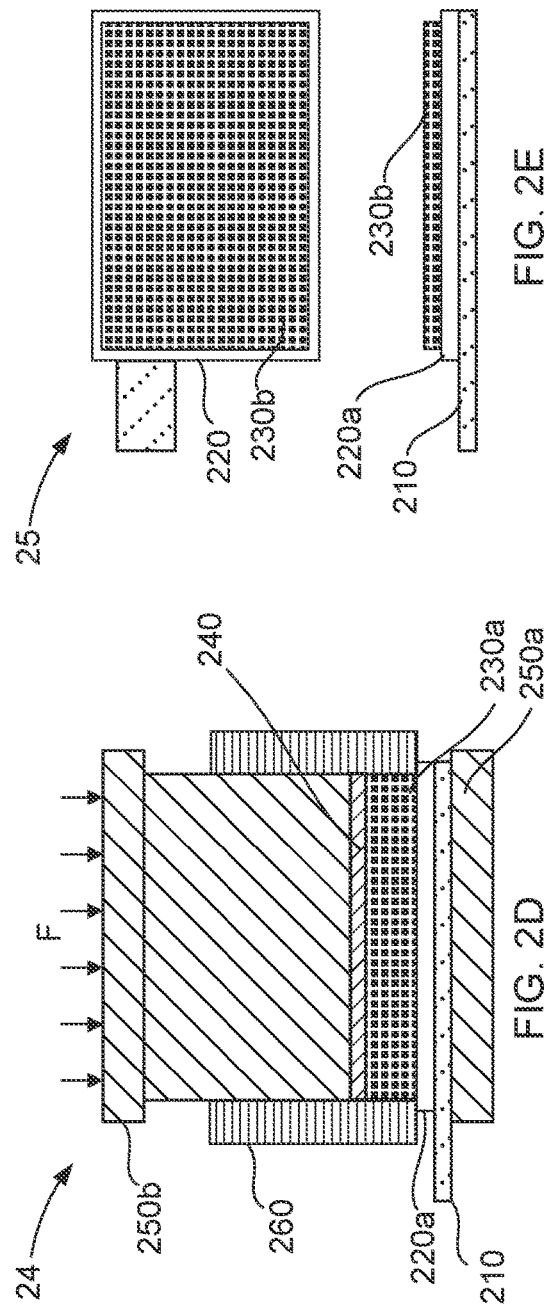

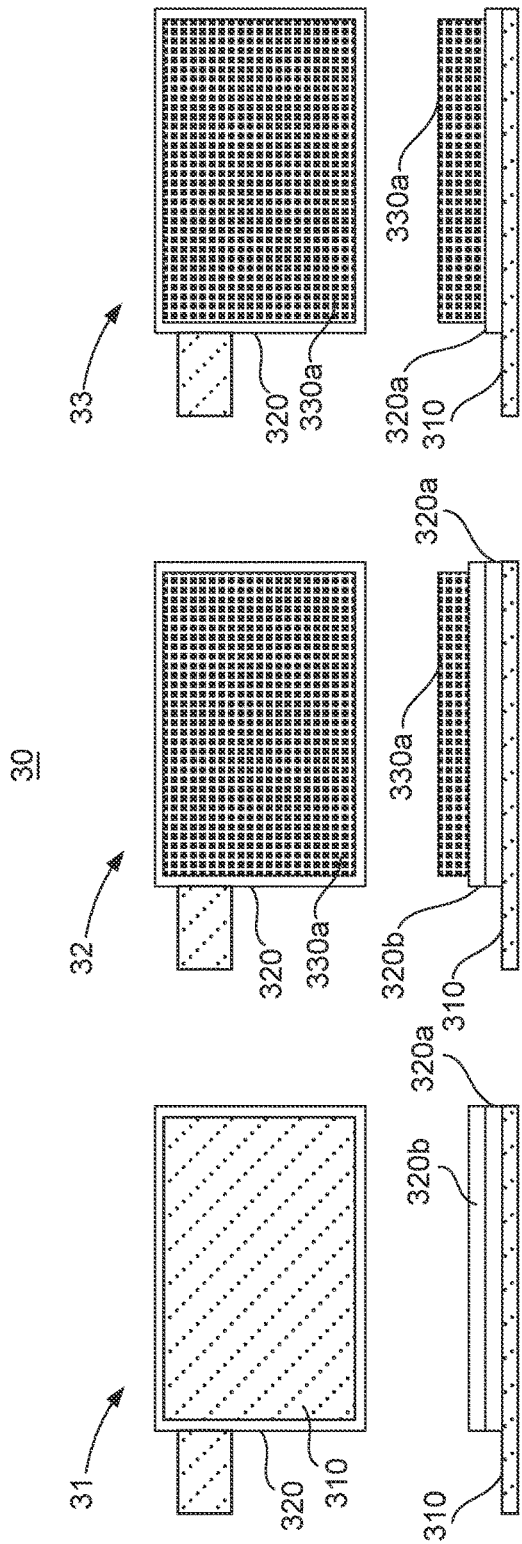

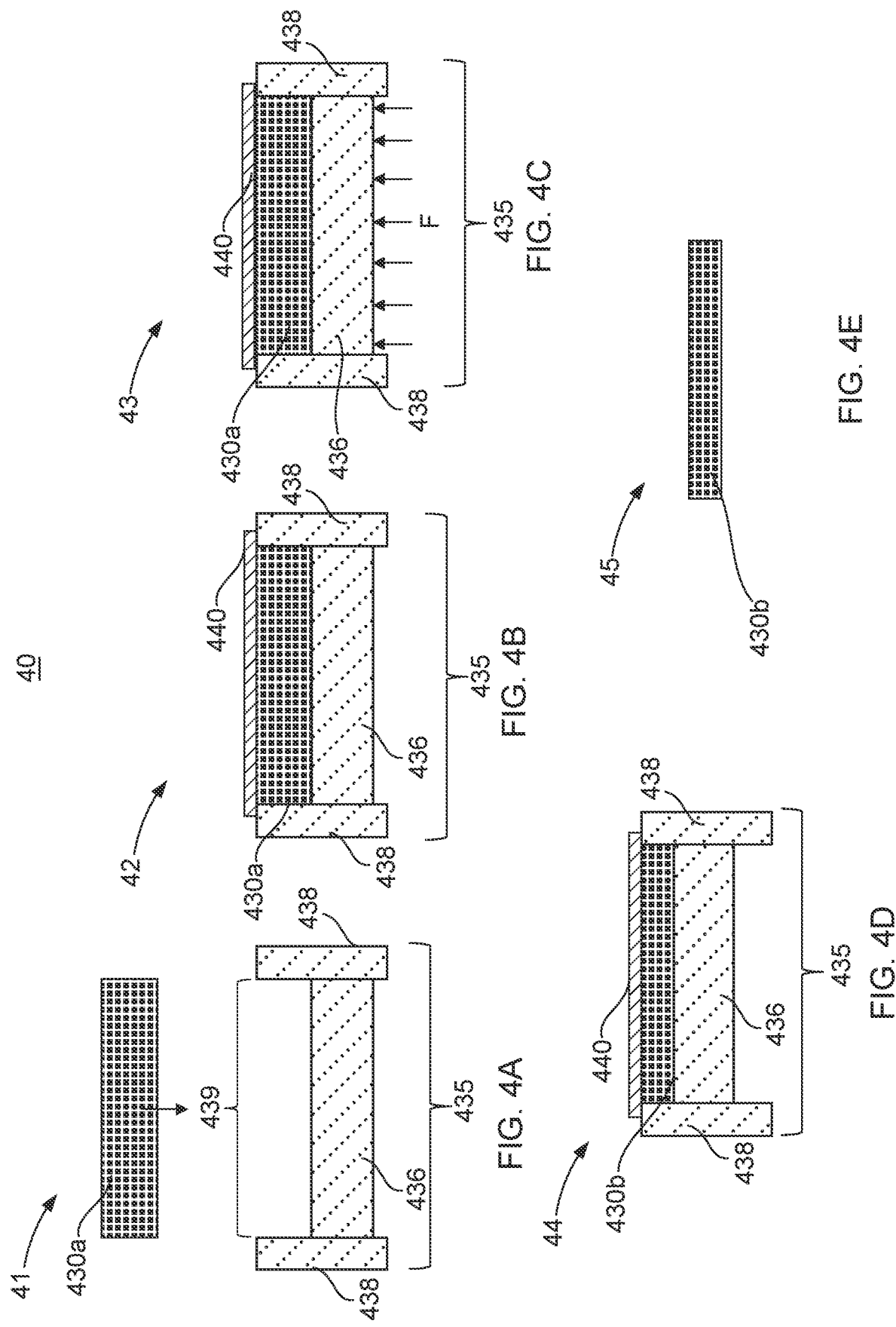

430b

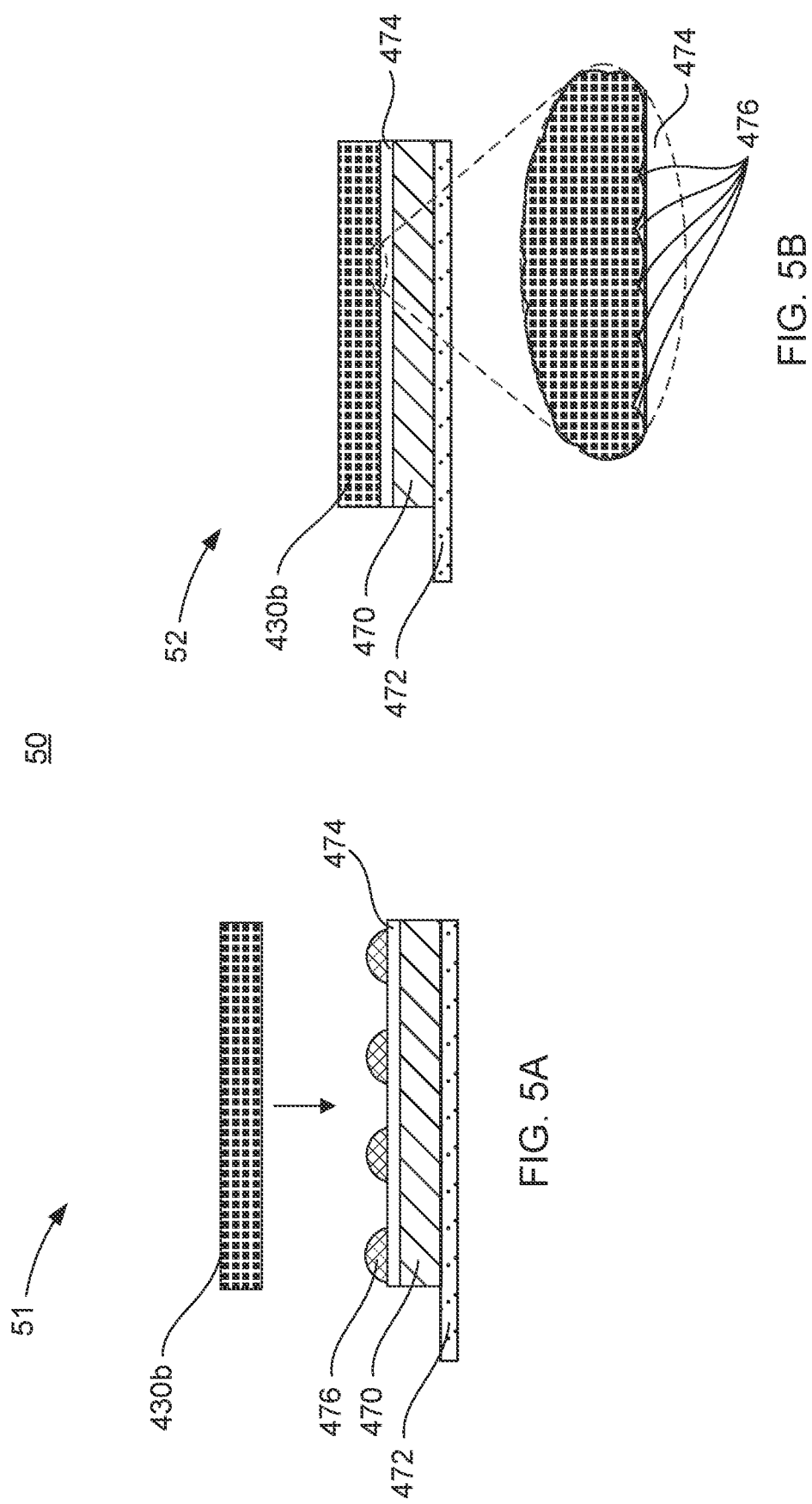

APPARATUSES AND PROCESSES FOR FORMING A SEMI-SOLID ELECTRODE HAVING HIGH ACTIVE SOLIDS LOADING AND ELECTROCHEMICAL CELLS INCLUDING THE SAME

CROSS-REFERENCE TO RELATED APPLICATIONS

This application claims the priority to and the benefit of U.S. Provisional Application No. 62/963,908, entitled "APPARATUSES AND PROCESSES FOR FORMING A SEMI-SOLID ELECTRODE HAVING HIGH ACTIVE SOLIDS LOADING AND ELECTROCHEMICAL CELLS INCLUDING THE SAME," and filed on Jan. 21, 2020, the disclosure of which is hereby incorporated by reference in its entirety.

BACKGROUND

Semi-solid electrodes can sometimes have a lower energy density than conventional electrodes for which the electrode material is often calendered after being applied to a current collector. As a result, semi-solid electrodes, which can have better conductivity and lower risk of ion entrapment within the electrode material as compared to conventional electrodes, are often made thicker to achieve the same capacity.

SUMMARY

Embodiments described herein relate generally to apparatuses and processes for forming semi-solid electrodes having increased active solids loading by removing excess electrolyte. In some embodiments, a method for converting the semi-solid electrode material from the first composition into the second composition includes a removal of a portion of the electrolyte from the semi-solid electrode material. In some embodiments, a semi-solid electrode material can be disposed onto a current collector, forming an intermediate electrode. In some embodiments, the method further includes mechanically compressing the intermediate electrode to remove the portion of electrolyte from the semi-solid electrode material. In some embodiments, the method can include disposing the intermediate electrode between a die and a base of a mechanical press and moving the die towards the base until compressive force is supplied to the intermediate electrode. In some embodiments, an absorptive material can be disposed within the mechanical press, for example between at least one of the die and the base, to absorb the portion of electrolyte removed from the intermediate electrode. In some embodiments, removing the portion of electrolyte from the intermediate electrode forms a finished electrode having higher active solids loading than previously described semi-solid electrode materials and electrodes comprised thereof.

In some embodiments, the semi-solid electrode material can be formed by mixing an active material and, optionally, a conductive material in a liquid electrolyte to form an electrode material including a mixture of solid and liquid phases. In some embodiments, the semi-solid electrode material can be disposed onto a current collector to form an intermediate electrode. In some embodiments, the intermediate electrode can include a semi-solid electrode material having a first composition in which the ratio of electrolyte to active material is between about 10:1 and about 1:1. In some embodiments, the intermediate electrode can be mechanically compressed to form a finished electrode including semi-solid electrode material having a second composition in which the ratio of electrolyte to active material is between about 5:1 and about 1:3.

BRIEF DESCRIPTION OF THE DRAWINGS

FIGS. 2A-2E illustrate a method of manufacturing a semi-solid electrode, according to an embodiment.

FIGS. 3A-3E illustrate a method of manufacturing a semi-solid electrode, according to an embodiment.

FIGS. 4A-4F illustrate a method of manufacturing a semi-solid electrode, according to an embodiment.

FIGS. 5A and 5B illustrate a method of additional use of a semi-solid electrode, according to an embodiment.

DETAILED DESCRIPTION

Figure 1:
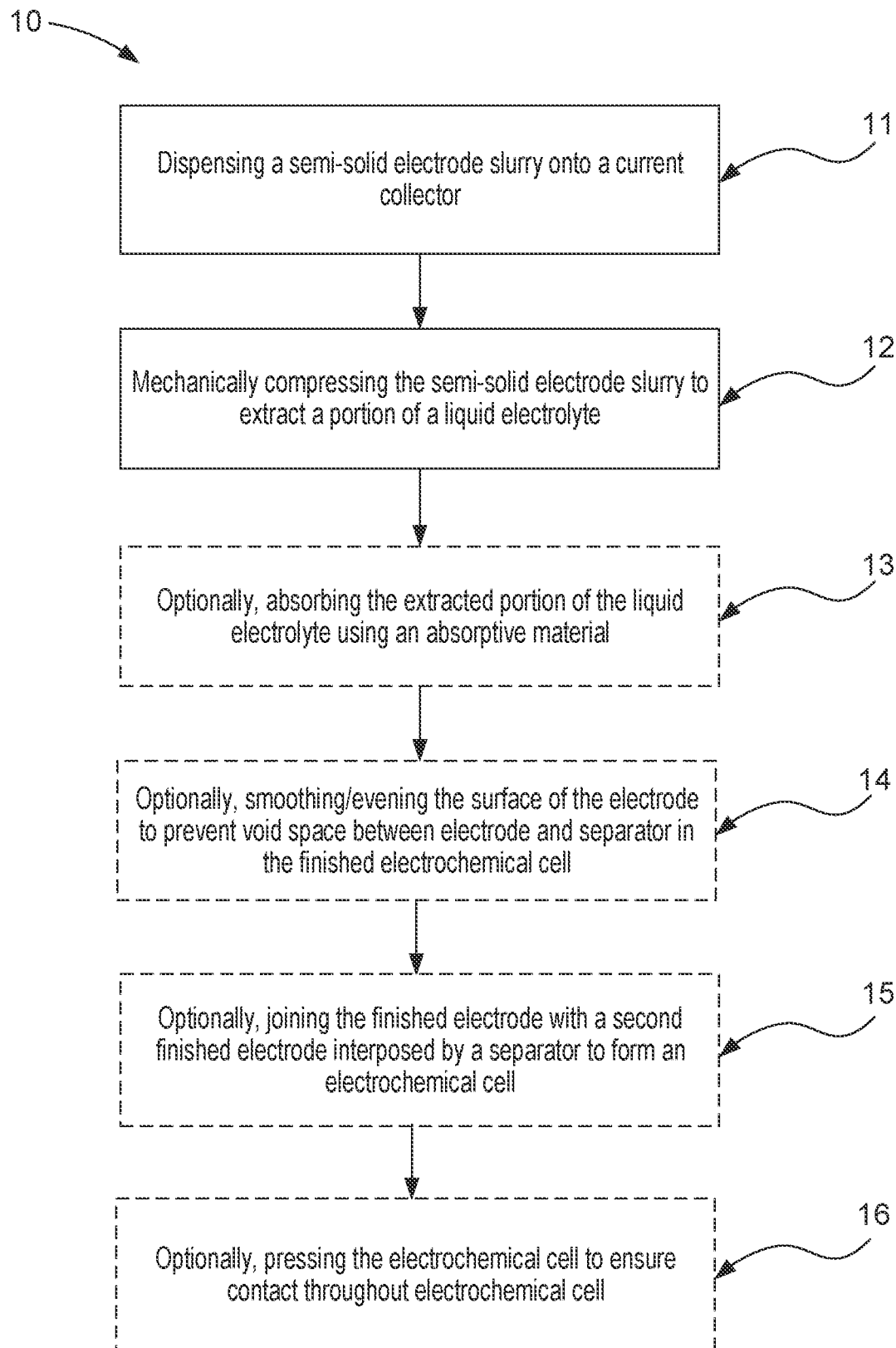
FIG. 1 illustrates a method of manufacturing a semi-solid electrode, according to an embodiment.

Embodiments described herein relate generally to methods for forming a semi-solid electrode material having a high active solids loading content, and methods for forming an electrochemical cell including the same. In some embodiments, the semi-solid electrode can be formed by mechanically compressing a semi-solid electrode material of an active material and a conductive material in a liquid electrolyte. In some embodiments, the active material can include particles of active material. In some embodiments, the active particles can be substantially free of any coating layers. In some embodiments, the conductive material can include particles of conductive material. In some embodiments, the conductive material can be free or substantially free of conductive fibers. In some embodiments, the semi-solid electrode material can include a first volume of the liquid electrolyte such that the semi-solid electrode material is flowable during manufacturing of the semi-solid electrode. In some embodiments, the semi-solid electrode material can be mechanically compressed in order to extract a portion of the liquid electrolyte and form a semi-solid electrode material having a second volume of the liquid electrolyte less than the first volume of the liquid electrolyte. In some embodiments, mechanically compressing includes compressing the semi-solid electrode material between a die and a base. In some embodiments, a semi-permeable membrane can be disposed between the semi-solid electrode material and at least one of the base and the die such that the portion of the liquid electrolyte can be extracted without removing any of the active material or the conductive material. In some embodiments, removing the portion of the liquid electrolyte from the semi-solid electrode material can form a semi-solid electrode material having a higher active solids content, e.g., greater than about 70 wt % of the active material.

Conventional electrode materials are typically manufactured by coating a metallic substrate (e.g., a current collector) with an electrode slurry composed of an active material, a conductive additive, and a binding agent dissolved or dispersed in a solvent or water, evaporating the solvent or water, and calendering the dried solid matrix to a specified thickness. The electrodes are then cut, packaged with other components, infiltrated with electrolyte and the entire package is then sealed. Such methods generally involve complicated and expensive manufacturing steps such as casting the electrode. These methods for producing electrodes result in batteries with lower capacity, lower energy density and a high ratio of inactive components to active materials. Furthermore, the binders used in known electrode formulations can increase tortuosity and decrease the ionic conductivity of the electrode. In some embodiments, electrodes described herein can be free or substantially free of binder.

Since the electrolyte is infused after calendering conventional electrode materials, it typically requires a significant amount of effort to infuse the electrolyte after forming the electrochemical cell. Conventional methods for infusing the calendered electrode materials with the liquid electrolyte include the use of high pressure or a long infusion time to achieve adequate permeation of the liquid electrolyte into the electrode material. Typically, conventional electrodes are therefore calendered to only about 20% porosity to facilitate the infusion of electrolyte into the calendered electrode material. Therefore, a trade-off exists between energy density of the finished electrode and the degree of densification of the electrode material. In other words, since conventional electrode materials after calendering are typically more dense, it can be more difficult to permeate with the liquid electrolyte. Therefore, conventional electrode materials are often not fully wetted by electrolyte after infusion, which means that the realized energy density can be substantially lower than the theoretical energy density.

Semi-solid electrodes and batteries formed therefrom can often be made thicker (having a higher capacity) without experiencing the conductivity issues of thicker conventional electrodes. However, the energy density of semi-solid electrodes can be less than conventional electrodes, in part because conventional electrodes are typically calendered and the slurrying solvent is removed during a drying step. Semi-solid electrodes are typically not dried or calendered because the electrodes are formed from a slurry of active material and, optionally, conductive material in a liquid electrolyte, in which case the drying or calendering steps would remove all or substantially all of the electrolyte from the electrode. Therefore, there is an ongoing need for semi-solid electrodes that have a higher active solids loading and electrochemical cells formed from the same.

As described herein, in some embodiments, semi-solid electrodes are prepared by initially slurrying an active material, an optional conductive material, and a liquid electrolyte into a semi-solid electrode material. Since the semi-solid electrode material already contains the liquid electrolyte in contact with the active material, the realized energy density of the finished electrode may be substantially similar to the theoretical energy density.

As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, the term "about" and "approximately" generally mean plus or minus 10% of the value stated, e.g., about 250 μm would include 225 μm to 275 μm, about 1,000 μm would include 900 μm to 1,100 μm.

As used herein, the term "semi-solid" refers to a material that is a mixture of liquid and solid phases, for example, such as a particle suspension, a slurry, a colloidal suspension, an emulsion, a gel, or a micelle. As used herein, the term "semi-solid electrode material" refers to a mixture of at least a solid active material and a liquid electrolyte.

As used herein, the terms "activated carbon network" and "networked carbon" relate to a general qualitative state of an electrode. For example, an electrode with an activated carbon network (or networked carbon) is such that the carbon particles within the electrode assume an individual particle morphology and arrangement with respect to each other that facilitates electrical contact and electrical conductivity between particles. Conversely, the terms "unactivated carbon network" and "unnetworked carbon" relate to an electrode wherein the carbon particles either exist as individual particle islands or multi-particle agglomerate islands that may not be sufficiently connected to provide adequate electrical conduction through the electrode.

In some embodiments, the method of manufacturing a semi-solid electrode having high active solids loading includes mixing an active material and a conductive material with a liquid electrolyte to form a semi-solid electrode material and disposing the semi-solid electrode material onto a current collector. The method can further include disposing a semi-permeable membrane onto an exposed surface of the semi-solid electrode material and compressing the semi-solid electrode material to extract a portion of the liquid electrolyte. In some embodiments, the semi-solid electrode can be compressed using a mechanical press. In some embodiments, the semi-permeable membrane can be configured to absorb the portion of the liquid electrolyte extracted during compressing. In some embodiments, an absorptive material can be used to absorb at least some of the extracted liquid electrolyte during mechanical pressing of the semi-solid electrode. In some embodiments, mechanically compressing the semi-solid electrode material includes compressing the semi-solid material between a die and a base. In some embodiments, the absorptive material can be disposed onto the exposed surface of the semi-permeable membrane, onto a contacting surface of the die, onto a contacting surface of the base, or any combination thereof. In some embodiments, the compressed semi-solid electrode material includes greater than about 70 wt % of the active material. In some embodiments, the semi-solid electrode material after mixing has a first composition in which the liquid electrolyte is between about 50 wt % and about 80 wt % of the semi-solid electrode material, and the semi-solid electrode material after compressing has a second composition in which the liquid electrolyte is between about 10 wt % and about 45 wt % of the semi-solid electrode material. In some embodiments, the semi-solid electrode material after mixing has a first ratio of liquid electrolyte to active material of between about 10:1 and about 1:1, and the semi-solid electrode material after compressing has a second ratio of liquid electrolyte to active material of between about 5:1 and about 1:3. In some embodiments, the semi-solid electrode material after mixing has a first active material molarity of between about 5M and about 15M, and the semi-solid electrode material after compressing has a second active material molarity of between about 16M and about 24M. In some embodiments, the semi-solid electrode material after mixing has a first energy density of between about 3 mAh/g and about 5 mAh/g, and the semi-solid electrode material after compressing has a second energy density of between about 6 mAh/g and about 14 mAh/g.

In some embodiments, the method of manufacturing a semi-solid electrode having high active solids loading can include mixing an active material and a conductive material with a liquid electrolyte to form a semi-solid electrode material having a first thickness, interposing the semi-solid electrode material between a current collector and a semi-permeable membrane, and mechanically compressing the semi-solid electrode material such that the semi-solid electrode material has a second thickness less than the first thickness. In some embodiments, the first thickness is between about 100 μm and about 2,000 μm. In some embodiments, the second thickness is between about 5 μm and about 50 μm. In some embodiments, mechanically compressing is accomplished by mechanically compressing the semi-solid electrode material between a base and a die of a mechanical press.

In some embodiments, the method of manufacturing a semi-solid electrode having high active solids loading can include mixing an active material and a conductive material with a liquid electrolyte to form a semi-solid electrode material having a first volume, interposing the semi-solid electrode material between a current collector and a semi-permeable membrane, and mechanically compressing the semi-solid electrode material such that the semi-solid electrode material has a second volume less than the first volume.

In some embodiments, the method of manufacturing a semi-solid electrode having high active solids loading can include mixing an active material and a conductive material with a liquid electrolyte to form a semi-solid electrode material having a first composition comprising between about 50 wt % and about 80 wt % of the liquid electrolyte, interposing the semi-solid electrode material between a current collector and a semi-permeable membrane, and mechanically compressing the semi-solid electrode material until the semi-solid electrode material has a second composition comprising between about 10 wt % and about 45 wt % of the liquid electrolyte.

In some embodiments, the method of manufacturing a semi-solid electrode having high active solids loading can include mixing an active material and a conductive material with a liquid electrolyte to form a first semi-solid electrode material having a first density, interposing the first semi-solid electrode material between a current collector and a semi-permeable membrane, and mechanically compressing the first semi-solid electrode material to form a second semi-solid electrode material having a second density greater than the first density. In some embodiments, the first density can be less than about 2 g/cm$^3$, less than about 1.9 g/cm$^3$, less than about 1.8 g/cm$^3$, less than about 1.7 g/cm$^3$, less than about 1.6 g/cm$^3$, less than about 1.5 g/cm$^3$, less than about 1.4 g/cm$^3$, less than about 1.3 g/cm$^3$, less than about 1.2 g/cm$^3$, less than about 1.1 g/cm$^3$, less than about 1 g/cm$^3$, inclusive of all values and ranges therebetween. In some embodiments, the second density is between about 2.1 g/cm$^3$ and about 5 g/cm$^3$, between about 2.2 g/cm$^3$ and about 4.5 g/cm$^3$, between about 2.3 g/cm$^3$ and about 4 g/cm$^3$, between about 2.4 g/cm$^3$ and about 3.5 g/cm$^3$, between about 2.5 g/cm$^3$ and about 3 g/cm$^3$, between about 2.5 g/cm$^3$ and about 5 g/cm$^3$, between about 3 g/cm$^3$ and about 5 g/cm$^3$, between about 3.5 g/cm$^3$ and about 5 g/cm$^3$, between about 4 g/cm$^3$ and about 5 g/cm$^3$, between about 4.5 g/cm$^3$ and about 5 g/cm$^3$, between about 2.1 g/cm$^3$ and about 4.5 g/cm$^3$, between about 2.1 g/cm$^3$ and about 4 g/cm$^3$, between about 2.1 g/cm$^3$ and about 3.5 g/cm$^3$, between about 2.1 g/cm$^3$ and about 3 g/cm$^3$, or between about 2.1 g/cm$^3$ and about 2.5 g/cm$^3$, inclusive of all values and ranges therebetween. In some embodiments, the second density is greater than about 2.1 g/cm$^3$, greater than about 2.5 g/cm$^3$, greater than about 3 g/cm$^3$, greater than about 3.5 g/cm$^3$, greater than about 4 g/cm$^3$, greater than about 4.5 g/cm$^3$, greater than about 5 g/cm$^3$, greater than about 5.5 g/cm$^3$, or greater than about 6 g/cm$^3$, inclusive of all values and ranges therebetween. In some embodiments, an energy density of the second semi-solid electrode material is greater than about 5 mAh/g, greater than about 6 mAh/g, greater than about 7 mAh/g, greater than about 8 mAh/g, greater than about 9 mAh/g, greater than about 10 mAh/g, greater than about 11 mAh/g, greater than about 12 mAh/g, greater than about 13 mAh/g, greater than about 14 mAh/g, or greater than about 15 mAh/g, inclusive of all values and ranges therebetween.

In some embodiments, the method of manufacturing a semi-solid electrode having high active solids loading can include the use of recycled electrochemical cell materials. In some embodiments, recycled electrochemical cell materials can include spent electrochemical cell materials, partially spent electrochemical cell materials, conductive electrochemical cell waste materials, and/or any other electrochemical cell materials that can be repurposed. In some embodiments, mechanically compressing recycled electrochemical cell materials can improve the overall conductivity and/or active material fraction of the recycled electrochemical cell materials. In some embodiments, the method of manufacturing a semi-solid electrode having high active solids loading can include the use of at least about 5 wt %, at least about 10 wt %, at least about 15 wt %, at least about 20 wt %, at least about 25 wt %, at least about 30 wt %, at least about 35 wt %, at least about 40 wt %, at least about 45 wt %, at least about 50 wt %, at least about 55 wt %, at least about 60 wt %, at least about 65 wt %, at least about 70 wt %, at least about 75 wt %, at least about 80 wt %, at least about 85 wt %, at least about 90 wt %, or at least about 95 wt % recycled electrochemical cell materials.

FIG. 1 illustrates a method 10 of forming a semi-solid electrode including active solid loadings higher than conventional electrodes while remaining flowable during electrode manufacturing. The method 10 can include dispensing a semi-solid electrode material onto a current collector, at 11, to form an intermediate electrode. In some embodiments, dispensing the semi-solid electrode material can include drop-casting the semi-solid electrode material onto a moving current collector to form or substantially form an electrode. In some embodiments, dispensing the semi-solid electrode material can include extruding the semi-solid electrode material from a moving extrusion nozzle or the like onto a fixed current collector. In some embodiments, the semi-solid electrode material can be dispensed via a fixed dispensing mechanism onto a fixed current collector, for example, in a discrete portion, and then the discrete portion of the semi-solid electrode material can be spread across the surface of the current collector by any suitable method to form or substantially form the electrode. In some embodiments, a current collector material can be apportioned into a plurality of the current collectors such that each of the plurality of current collectors is separated from the others. Discrete portions of the semi-solid electrode material can then be disposed onto a surface of each of the individualized current collectors to form or substantially form the electrode. In some embodiments, the electrode formed according to step 11 of the method 10 includes an intermediary electrode material such that the electrode could be operable in an electrochemical cell, but which has a lower active solids loading than desired for a finished electrode. The formed electrode can be a positive electrode, an anode, a negative electrode, a cathode, or any other electrode or component of an electrochemical cell. As described herein, the electrode can be a semi-solid electrode including at least an active material and/or a conductive material in a liquid electrolyte.

In some embodiments, the semi-solid electrode material can include any suitable composition of active material and/or conductive material in a liquid electrolyte, such as those compositions described in further detail in U.S. Pat. Nos. 8,993,159, 9,178,200, 9,184,464, 9,203,092, 9,362,583, 9,385,392, 9,401,501, 9,437,864, 9,484,569, 9,812,674, 9,825,280, 9,831,518, and 9,831,522, the entire disclosures of which are hereby incorporated herein by reference. Examples of methods of manufacturing semi-solid electrodes and electrochemical cells having semi-solid electrodes are described in further detail in U.S. Provisional Patent Application No. 62/695,483 (hereafter "the '483 Application", filed Jul. 9, 2018, entitled "Continuous and Semi-Continuous Methods of Semi-Solid Electrode and Battery Manufacturing," the entire disclosure of which is hereby incorporated herein by reference.

In some embodiments, in order to form a semi-solid electrode material that can be more easily disposed onto the current collector, the semi-solid electrode material can have a first composition in which the ratio of electrolyte to active material is between about 10:1 and about 1:1, about 9:1 and about 2:1, about 8:1 and about 3:1, about 7:1 and about 4:1, about 6:1 and about 5:1, about 10:1 and about 2:1, about 10:1 and about 3:1, about 10:1 and about 4:1, about 10:1 and about 5:1, about 10:1 and about 6:1, about 10:1 and about 7:1, about 10:1 and about 8:1, about 10:1 and about 9:1, about 9:1 and about 1:1, about 8:1 and about 1:1, about 7:1 and about 1:1, about 6:1 and about 1:1, about 5:1 and about 1:1, about 4:1 and about 1:1, about 3:1 and about 1:1, or about 2:1 and about 1:1, inclusive of all values and ranges therebetween. In some embodiments, when the semi-solid electrode material has the first composition, the semi-solid electrode material may be more easily handled and dispensed onto the current collector because of a relatively low viscosity as compared with the desired viscosity of the semi-solid electrode material in the finished electrode.

In some embodiments, the first composition of the semi-solid electrode material can have an energy density of between about 0.1 mAh/g and about 10 mAh/g, between about 0.5 mAh/g and about 9.5 mAh/g, between about 1 mAh/g and about 9 mAh/g, between about 1.5 mAh/g and about 8.5 mAh/g, between about 2 mAh/g and about 8 mAh/g, between about 2.5 mAh/g and about 7.5 mAh/g, between about 3 mAh/g and about 7 mAh/g, between about 0.1 mAh/g and about 9.5 mAh/g, between about 0.1 mAh/g and about 9 mAh/g, between about 0.1 mAh/g and about 8.5 mAh/g, between about 0.1 mAh/g and about 8 mAh/g, between about 0.1 mAh/g and about 7.5 mAh/g, between about 0.1 mAh/g and about 7 mAh/g, between about 0.1 mAh/g and about 6.5 mAh/g, between about 0.1 mAh/g and about 6 mAh/g, between about 0.5 mAh/g and about 10 mAh/g, between about 1 mAh/g and about 10 mAh/g, between about 1.5 mAh/g and about 10 mAh/g, between about 2 mAh/g and about 10 mAh/g, between about 2.5 mAh/g and about 10 mAh/g, between about 3 mAh/g and about 10 mAh/g, between about 3.5 mAh/g and about 10 mAh/g, between about 4 mAh/g and about 10 mAh/g, between about 4.5 mAh/g and about 10 mAh/g, between about 5 mAh/g and about 10 mAh/g, between about 5.5 mAh/g and about 10 mAh/g, between about 6 mAh/g and about 10 mAh/g, between about 6.5 mAh/g and about 10 mAh/g, or between about 7 mAh/g and about 10 mAh/g, inclusive of all values and ranges therebetween. In some embodiments, the first composition of the semi-solid electrode material can have an energy density of less than about 10 mAh/g, about 9.5 mAh/g, about 9 mAh/g, about 8.5 mAh/g, about 8 mAh/g, about 7.5 mAh/g, about 7 mAh/g, about 6.5 mAh/g, about 6 mAh/g, about 5.5 mAh/g, about 5 mAh/g, about 4.5 mAh/g, about 4 mAh/g, about 3.5 mAh/g, about 3 mAh/g, about 2.5 mAh/g, about 2 mAh/g, about 1.5 mAh/g, about 1 mAh/g, about 0.5 mAh/g, or about 0.1 mAh/g, inclusive of all values and ranges therebetween.

In some embodiments, the semi-solid electrode material disposed on a surface of the current collector can have a thickness where the thickness is a dimension of the semi-solid electrode material in a direction perpendicular to the surface of the current collector. In some embodiments, the semi-solid electrode material can have a thickness before being mechanically compressed of between about 51 μm and about 3,000 μm, about 75 μm and about 2,500 μm, about 100 μm and about 2,000 μm, about 150 μm and about 1,500 μm, about 200 μm and about 1,000 μm, about 250 μm and about 750 μm, about 51 μm and about 2,500 μm, about 51 μm and about 2,000 μm, about 51 μm and about 1,500 μm, about 51 μm and about 1,000 μm, about 100 μm and about 3,000 μm, about 200 μm and about 3,000 μm, about 300 μm and about 3,000 μm, about 400 μm and about 3,000 μm, about 500 μm and about 3,000 μm, about 750 μm and about 3,000 μm, about 1,000 μm and about 3,000 μm, about 1,500 μm and about 3,000 μm, about 2,000 μm and about 3,000 μm, or about 2,500 μm and about 3,000 μm, inclusive of all values and ranges therebetween. In some embodiments, the semi-solid electrode material can have a thickness before being mechanically compressed of greater than about 51 μm, about 75 μm, about 100 μm, about 150 μm, about 200 μm, about 250 μm, about 300 μm, about 400 μm, about 500 μm, about 750 μm, about 1,000 μm, about 1,500 μm, about 2,000 μm, about 2,500 μm, or about 3,000 μm, inclusive of all values and ranges therebetween.

The method 10 can include mechanically compressing the semi-solid electrode material to extract a portion of the liquid electrolyte, at 12. In some embodiments, the semi-solid electrode material, after extracting the portion of the liquid electrolyte, can have a second composition. In some embodiments, mechanical compression of the semi-solid electrode material can result in deformation (e.g., volume reduction, thickness reduction, length reduction, height reduction, combinations thereof, and the like) of at least a portion of the semi-solid electrode material and no or substantially no deformation of the current collector. In some embodiments, mechanically compressing the intermediate electrode material can result in the removal of the portion of electrolyte from the semi-solid electrode material.

In some embodiments, mechanically compressing can include disposing the intermediate electrode between a die and a base of a mechanical press and moving the die towards the base until compressive force is applied to the intermediate electrode. In some embodiments, the die and the base can be configured to be the same or substantially the same shape and size as the intermediate electrode. In some embodiments, the mechanical press can be a stamp press including a motor and a piston configured to apply a moving force to the die, the die dimensioned and configured to apply compressive force to the intermediate electrode held in place by the base. In some embodiments, the intermediate electrode can be positioned in the mechanical press such that an exposed surface or a portion of the exposed surface of the current collector abuts the base while an exposed surface or a portion of the exposed surface of the semi-solid electrode material abuts the die. In some embodiments, the intermediate electrode can be positioned in the mechanical press such that the exposed surface or a portion of the expose surface of the semi-solid electrode material abuts the base while the exposed surface or a portion of the exposed surface of the current collector abuts the die. In some embodiments, the base and/or the die can have a contacting surface. In some embodiments, the base and/or the die can have an interfacial region between the contacting surface of the base and/or the contacting surface of the die and the current collector and/or the semi-solid electrode material.

In some embodiments, a contacting surface of the die and/or a contacting surface of the base can include a cavity such that, during mechanical compression of the intermediate electrode, the removed electrolyte or a portion thereof can be held within or communicated through the cavity. In some embodiments, during mechanical compression of the intermediate electrode, the removed electrolyte or a portion thereof can be communicated out of the semi-solid electrode material, through a porous current collector, and into or through the cavity. In some embodiments, the removed electrolyte or a portion thereof can be communicated out of the semi-solid electrode material, around the ends or edges of the current collector, and out from between the base and the die. In some embodiments, the removed electrolyte or a portion thereof can be communicated out of the semi-solid electrode material in a direction opposite the current collector, and into or through the cavity. In some embodiments, the removed electrolyte or a portion thereof can be communicated out of the semi-solid electrode material via more than one of the pathways described herein. In some embodiments, the cavity can be fluidically coupled to a drain such that removed electrolyte communicated into or through the cavity can be removed from the mechanical press via the drain. In some embodiments, the cavity can be fluidically coupled to a reservoir such that removed electrolyte communicated into or through the cavity can be removed from the mechanical press via the reservoir. In some embodiments, removed electrolyte held in the reservoir may be reusable and/or recyclable for use in other semi-solid electrodes or elsewhere.

In some embodiments, a semi-permeable membrane can be disposed on or about the semi-solid electrode material such that, during mechanical compression of the intermediate electrode, the semi-permeable membrane allows the communication of electrolyte out of the semi-solid electrode material while disallowing the communication of active material, conductive material, or the like out of the semi-solid electrode material. In some embodiments, the semi-permeable membrane can be a sheet or other planar structure configured to be removed from on or about the semi-solid electrode material before or after removing the intermediate electrode from the mechanical press and before incorporating the mechanically compressed electrode into an electrochemical cell or the like. In some embodiments, the semi-permeable membrane can be a conventional separator material configured to allow at least some flux of liquid electrolyte therethrough. In some embodiments, the semi-permeable membrane can be any material that allows at least some flux of liquid electrolyte therethrough while being completely or substantially chemically inert with regard to the composition of the semi-solid electrode material and/or the current collector. In some embodiments, the semi-permeable membrane can absorb at least a portion of the extracted liquid electrolyte such that the liquid electrolyte cannot be, substantially cannot be, or can be only partially absorbed back into the semi-solid electrode material.

In some embodiments, removing the portion of electrolyte from the intermediate electrode forms a finished electrode having higher active solids loading than previously described semi-solid electrode materials and electrodes comprised thereof. Without wishing to be bound by any particular theory, removing a portion of the electrolyte (e.g., an excess portion of a liquid electrolyte) can reduce the volume of the semi-solid electrode material on the current collector by removing electrolyte and through compressive removal of voids and porosity, without a corresponding reduction in conductivity across the semi-solid electrode material. In some embodiments, the reduction in porosity can include a reduction in porosity from about between about 20% and about 50% to between about 5% and about 30%, inclusive of all values and ranges therebetween.

In some embodiments, the second composition of the semi-solid electrode material can have a ratio of electrolyte to active material less than the first composition. In some embodiments, the second composition of the semi-solid electrode material can have a ratio of electrolyte to active material between about 5:1 and about 1:3, about 4:1 and about 1:2, about 3:1 and about 1:1, about 5:1 and about 1:2, about 5:1 and about 1:1, about 5:1 and about 2:1, about 5:1 and about 3:1, about 5:1 and about 4:1, about 4:1 and about 1:3, about 3:1 and about 1:3, about 2:1 and about 1:3, about 1:1 and about 1:3, or about 1:2 and about 1:3, inclusive of all values and ranges therebetween.

In some embodiments, the second composition of the semi-solid electrode material can have an energy density of between about 5 mAh/g and about 24 mAh/g, between about 6 mAh/g and about 23 mAh/g, between about 7 mAh/g and about 22 mAh/g, between about 8 mAh/g and about 21 mAh/g, between about 9 mAh/g and about 20 mAh/g, between about 10 mAh/g and about 19 mAh/g, between about 11 mAh/g and about 18 mAh/g, between about 12 mAh/g and about 17 mAh/g, between about 13 mAh/g and about 16 mAh/g, between about 14 mAh/g and about 15 mAh/g, between about 5 mAh/g and about 23 mAh/g, between about 5 mAh/g and about 22 mAh/g, between about 5 mAh/g and about 21 mAh/g, between about 5 mAh/g and about 20 mAh/g, between about 5 mAh/g and about 19 mAh/g, between about 5 mAh/g and about 18 mAh/g, between about 5 mAh/g and about 17 mAh/g, between about 5 mAh/g and about 16 mAh/g, between about 5 mAh/g and about 15 mAh/g, between about 5 mAh/g and about 14 mAh/g, between about 5 mAh/g and about 13 mAh/g, between about 5 mAh/g and about 12 mAh/g, between about 5 mAh/g and about 11 mAh/g, between about 5 mAh/g and about 10 mAh/g, between about 5 mAh/g and about 9 mAh/g, between about 5 mAh/g and about 8 mAh/g, between about 5 mAh/g and about 7 mAh/g, between about 5 mAh/g and about 6 mAh/g, between about 6 mAh/g and about 24 mAh/g, between about 7 mAh/g and about 24 mAh/g, between about 8 mAh/g and about 24 mAh/g, between about 9 mAh/g and about 24 mAh/g, between about 10 mAh/g and about 24 mAh/g, between about 11 mAh/g and about 24 mAh/g, between about 12 mAh/g and about 24 mAh/g, between about 13 mAh/g and about 24 mAh/g, between about 14 mAh/g and about 24 mAh/g, between about 15 mAh/g and about 24 mAh/g, between about 16 mAh/g and about 24 mAh/g, between about 17 mAh/g and about 24 mAh/g, between about 18 mAh/g and about 24 mAh/g, between about 19 mAh/g and about 24 mAh/g, between about 20 mAh/g and about 24 mAh/g, between about 21 mAh/g and about 24 mAh/g, between about 22 mAh/g and about 24 mAh/g, or between about 23 mAh/g and about 24 mAh/g, inclusive of all values and ranges therebetween. In some embodiments, the first composition of the semi-solid electrode material can have an energy density of greater than about 5 mAh/g, about 6 mAh/g, about 7 mAh/g, about 8 mAh/g, about 9 mAh/g, about 10 mAh/g, about 11 mAh/g, about 12 mAh/g, about 13 mAh/g, about 14 mAh/g, about 15 mAh/g, about 16 mAh/g, about 17 mAh/g, about 18 mAh/g, about 19 mAh/g, about 20 mAh/g, about 21 mAh/g, about 22 mAh/g, about 23 mAh/g, or about 24 mAh/g, inclusive of all values and ranges therebetween.

In some embodiments, the semi-solid electrode material can have a thickness after being mechanically compressed of between about 1 µm and about 50 µm, about 2 µm and about 49 µm, about 3 µm and about 48 µm, about 4 µm and about 47 µm, about 5 µm and about 46 µm, about 6 µm and about 45 µm, about 7 µm and about 44 µm, about 8 µm and about 43 µm, about 9 µm and about 42 µm, about 10 µm and about 41 µm, about 15 µm and about 40 µm, about 20 µm and about 30 µm, about 2 µm and about 50 µm, about 3 µm and about 50 µm, about 4 µm and about 50 µm, about 5 µm and about 50 µm, about 6 µm and about 50 µm, about 7 µm and about 50 µm, about 8 µm and about 50 µm, about 9 µm and about 50 µm, about 10 µm and about 50 µm, about 11 µm and about 50 µm, about 12 µm and about 50 µm, about 13 µm and about 50 µm, about 14 µm and about 50 µm, about 15 µm and about 50 µm, about 20 µm and about 50 µm, about 25 µm and about 50 µm, about 30 µm and about 50 µm, about 35 µm and about 50 µm, about 40 µm and about 50 µm, or about 45 µm and about 50 µm, inclusive of all values and ranges therebetween. In some embodiments, the semi-solid electrode material can have a thickness after being mechanically compressed of less than about 50 µm, about 49 µm, about 48 µm, about 47 µm, about 46 µm, about 45 µm, about 44 µm, about 43 µm, about 42 µm, about 41 µm, about 40 µm, about 39 µm, about 38 µm, about 37 µm, about 36 µm, about 35 µm, about 34 µm, about 33 µm, about 32 µm, about 31 µm, about 30 µm, about 29 µm, about 28 µm, about 27 µm, about 26 µm, about 25 µm, about 24 µm, about 23 µm, about 22 µm, about 21 µm, about 20 µm, about 19 µm, about 18 µm, about 17 µm, about 16 µm, about 15 µm, about 14 µm, about 13 µm, about 12 µm, about 11 µm, about 10 µm, about 9 µm, about 8 µm, about 7 µm, about 6 µm, about 5 µm, about 4 µm, about 3 µm, about 2 µm, or about 1 µm, inclusive of all values and ranges therebetween.

The method 10 can optionally include absorbing the extracted portion of the liquid electrolyte using an absorptive material, at 13. In some embodiments, an absorptive material can be disposed within the mechanical press, for example between the intermediate electrode and at least one of the die and the base, to absorb at least a portion of the electrolyte removed from the intermediate electrode. In some embodiments, the absorptive material can be an integral component of the mechanical press. In some embodiments, the absorptive material can be coupled to the die of the mechanical press such that when the die compresses the semi-solid electrode material against the current collector positioned on the base, the extracted liquid electrolyte is absorbed by the absorptive material. In some embodiments, the absorptive material can be coupled to the base of the mechanical press. In some embodiments, current collector can be at least partially porous such that liquid electrolyte removed from the semi-solid electrode material during compressing of the intermediate electrode can be communicated through the current collector and into the absorptive material. In some embodiments, the absorptive material can be reusable. In some embodiments, a first intermediate electrode can be mechanically compressed and removed liquid electrolyte can be absorbed by the absorptive material. After mechanically compressing the intermediate electrode, the finished electrode can be removed from the mechanical press. The mechanical press can then be operated into a closed position such that the die and/or base are moved such that the absorptive material is compressed therebetween, removing the extracted liquid electrolyte from the liquid electrolyte. In some embodiments, after the extracted liquid electrolyte is removed from the absorptive material, the mechanical press can be returned to an open position and a second intermediate electrode can be disposed between the base and the die in order to be mechanically compressed. In some embodiments, after pressing the intermediate electrode in the mechanical press, the extracted liquid electrolyte can be removed from the absorptive material and the same intermediate electrode can be pressed a second time until a sufficient quantity of liquid electrolyte has been removed to achieve the desired composition for the finished electrode.

In some embodiments, the absorptive material can include any of a fiber material, cotton fibers, rice husks, superhydrophobic sawdust, a cellulose-based material, a superabsorbing polymer, a zeolite material, aerogels, nanocellulose aerogels, hydrogels, polyurethane, polypropylene, polyethylene, and cross-linked polymers, nanoparticles, carbon nanotubes, poly(dimethylsiloxane), sepiolite, talc, montmorillonite, mixture of sphagnum peat moss, charcoal, and sawdust, combinations thereof, and the like.

In some embodiments, the absorptive material can be used in addition to the base and/or the die having the cavity. In some embodiments, absorptive material can be used instead of the base and/or the die having the cavity. In some embodiments, the cavity can be at least partially filled with the absorptive material such that when the extracted electrolyte is communicated into the cavity, the absorptive material can capture all, substantially all, most, some, or a portion of the extracted electrolyte against reabsorption of at least that portion back into the semi-solid electrode material. In some embodiments, the absorptive material can be positioned such that when the extracted electrolyte or a portion thereof is communicated through the cavity, for example, through the cavity and into the reservoir or drain fluidically coupled thereto, the absorptive material can capture all, substantially all, most, some, or a portion of the extracted electrolyte against communication of at least that portion back into the cavity and/or reabsorption of at least that portion back into the semi-solid electrode material. In some embodiments, the absorptive material can be positioned about the edges of the base, the die, and/or the intermediate electrode such that any portion of the electrolyte that is removed from the semi-solid electrode material via the edges of the intermediate electrode can be captured, substantially captured, or at least partially captured by the absorptive material. In some embodiments, the absorptive material can be interposed between the die or the base and the semi-permeable membrane. In some embodiments, the absorptive material can be interposed between the porous current collector and the base or the die. In some embodiments, the absorptive material can be positioned in more than one of the configurations described herein, for example, absorptive material can be placed between the base and the current collector, between the die and the semi-permeable membrane that is positioned on the exposed surface of the semi-solid electrode material, and about the edges of the intermediate electrode such that all or substantially all of the removed excess electrolyte can be captured by the absorptive material.

In some embodiments, once the composition of the semi-solid electrode material matches or substantially matches the desired composition of the semi-solid electrode material in the finished electrode, the electrode can be removed from the mechanical press. In some embodiments, the electrode can be weighed before being mechanically pressed, can then be mechanically pressed for a first time period to remove a first portion of the electrolyte, and then weighed again, the difference between the first weight and the second weight operable to determine the mass of electrolyte removed. If the mass of electrolyte removed corresponds sufficiently with the desired volume or mass of electrolyte to be removed, then the electrode can be considered a finished electrode and is ready for further processing or incorporation into an electrochemical cell. If the mass of electrolyte removed does not correspond sufficiently with the desired volume or mass of electrolyte to be removed, then the electrode can be mechanically pressed for a second time period to remove a second portion of the electrolyte, and then weighed a third time, the different between the second weight and the third weight operable to determine the mass of electrolyte removed during the second time period. If the mass of electrolyte removed during the first time period plus the mass of electrolyte removed during the second time period equals or substantially equals the desired mass of electrolyte to be removed from the semi-solid electrode material, then the electrode can be considered a finished electrode. Mechanical compression of the intermediate electrode can continue in this iterative manner until the total volume or mass of electrolyte removed equals or substantially equals the desired volume or mass of electrolyte to be removed. In some embodiments, electrolyte can be reapplied to the semi-solid electrode, in the event that more than the desired amount of electrolyte has been removed from the electrode. In some embodiments, the reapplication of the electrolyte can be done via spraying, dripping, or any other suitable application method.

In some embodiments, the finished electrode can include an electrode tab electrically connected to the current collector and configured to transport electrons into or out of the electrode. In some embodiments, the electrode tab can extend beyond the current collector and/or the insulating material. In some embodiments, the electrode tab can be electrically coupled to the current collector before the semi-solid electrode material is disposed onto the current collector. In some embodiments, the cell can include integrated electrical tabbing, which can obviate the need for (i) a discrete tab component (e.g., an electrical lead), (ii) connecting dedicated tabs to current collectors, and (iii) a dedicated tab sealing operation. Instead, in some embodiments, an electrical tab or lead can be provided as an extension of the current collector integral to the current collector. In some embodiments, the tab or lead can be defined by removal of material from a larger area of current collector material, thereby defining the current collector and the tab or lead.

The method 10 optionally includes smoothing and/or evening the surface of the electrode (e.g., cathode) to prevent void space between the electrode and the separator in the finished electrochemical cell 14. The contact between the electrode and the absorptive material can leave the surface of the electrode rough and uneven. Smoothing and/or evening the electrode surface can make the surface of the electrode flush with the surface that eventually contacts the electrode surface (e.g., a separator surface, a current collector surface, a surface of a second electrode). Configuring these surfaces to be flush with one another can aid in preventing overpotential losses that result from void spaces between the surfaces. In some embodiments, smoothing and/or evening the electrode surface can be done with a doctor blade, a spatula, or any other suitable smoothing apparatus.

The method 10 optionally includes joining the finished electrode (e.g., cathode) with a second finished electrode (e.g., anode), interposed with a separator, to form a finished electrochemical cell 15. In other words, once the finished electrode has been individualized and excess electrolyte has been removed, the finished electrode can be assembled into the electrochemical cell with the second finished electrode exhibiting the opposite redox reaction. In other words, the cathode and the anode can be joined together with a separator disposed between.

In some embodiments, the separator can be disposed between the anode and the cathode. In some embodiments, the separator can be joined to at least one of the anode and the cathode with an adhesive. In some embodiments, one anode, one cathode and one separator can be stacked together to form a unit cell assembly. Each unit cell assembly can also include conductive tabs (also referred to as a lead) to couple the electrodes to external circuits. Multiple unit cell assemblies are then stacked or arrayed together to form a battery cell. In some embodiments, the number of unit cell assemblies in a battery cell may vary depending on, for example, the desired capacity and/or thickness of the resulting battery cell. These stacked unit cell assemblies are electrically in parallel, and respective tabs in each unit cell assembly are typically welded together via welding processes such as resistance welding, laser welding, and ultrasonic welding, seam welding, electric beam welding, among others.

The method 10 optionally includes pressing the electrochemical cell or stack of electrochemical cells to ensure contact throughout the electrochemical cell or stack of electrochemical cells. Applying a force to the electrochemical cell or stack of electrochemical cells can aid in reducing or substantially eliminating void spaces in the electrochemical cell or stack of electrochemical cells. These void spaces can be at interfaces between the electrodes and the separator, between electrodes and current collectors, and/or between electrochemical cells.

In some embodiments, the prepared electrochemical cell can be vacuum sealed in a prismatic pouch which can provide hermetic isolation of the electrochemical cell materials from the environment. Thus, the pouch can serve to avoid leakage of hazardous materials such as electrolyte solvents and/or corrosive salts to the ambient environment, and can prevent water and/or oxygen infiltration into the cell. Other functions of the pouch can include, for example, compressive packaging of the internal layers, voltage isolation for safety and handling, and mechanical protection of the electrochemical cell assembly. In some embodiments, during vacuum pouch sealing, electrolyte can be injected into the stacked unit cell assembly and the unit cell assemblies and the electrolyte can then be sealed into a pouch. In some embodiments, no electrolyte is added during the pouch sealing step if the semi-solid electrode material may contain the total desired quantity of electrolyte already.

In some embodiments, the sealed battery cell can then be subjected to a formation process, in which an initial charging operation can be performed to create a stable solid-electrolyte-interphase (SEI) layer that can passivate the electrode-electrolyte interface as well as prevent side reactions. In some embodiments, several cycles of charging and discharging can be carried out to ensure that the capacity of the batteries meets the required specifications. In some embodiments, a degassing step can be performed to release gases introduced or produced during the initial charging stage or during the electrochemical reactions in the battery formation step. The presence of entrapped gas in the electrodes generally reduces the conductivity and density of the electrodes, and limits the amount of active electrochemical materials that can be placed in a battery cell and may cause dendrite growth that can erode battery performance in lithium batteries. In some embodiments, dendrite formation may lead to a reduction in cycle life and a reduction in overall safety performance. In some embodiments, a reseal step can be taken to seal the battery cell again after the entrapped gas is released.

FIGS. 2A-2E illustrate a method 20 of forming a semi-solid electrode material 230b having a higher active material concentration and a higher energy density without requiring an electrolyte infusion step and/or a drying step. The method 20 includes forming an intermediate electrode by first disposing a stencil 220a, 220b (collectively "stencil 220"), onto a current collector 210 (e.g., a foil current collector), at 21. The current collector 210 can be any suitably conductive material configured to transport ions/electrons between the electrode material and a source or a sink. In some embodiments, the stencil 220 can include any material impermeable to transport of a semi-solid electrode material therethrough. In some embodiments, the stencil 220 can be dimensioned and configured to extend about or substantially about the current collector 210 circumferentially or about the exterior dimensions of the current collector 210. In some embodiments, the stencil 220 can have dimensions that are the same or substantially the same as the current collector 210. In some embodiments, the stencil 220 can include a masking material, such as that described in the '483 Application. In some embodiments, the masking material can be a tape or a similar material that can be applied onto the current collector 210 or about the current collector 210 to contain the semi-solid electrode material during deposition of the semi-solid electrode material onto the current collector 210, during later steps of manufacturing of the electrochemical cell, and/or during use of the electrochemical cell.

In some embodiments, instead of or in addition to masking material, as described above, the endo frame structure can be disposed onto the current collector 210 before disposing the semi-solid electrode material onto the current collector 210. In some embodiments, the endo frame can hold the current collector 210 in place or substantially in place during deposition of the semi-solid electrode material. In some embodiments, the endo frame can have at least some z-directional thickness such that the endo frame at least partially defines an inner region into which the semi-solid electrode material can be disposed and retained on the surface of the current collector 210.

In some embodiments, the endo frame can at least partially define the surface area of the finished electrode (e.g., as the interior extents of the endo frame). In some embodiments, the endo frame can at least partially define the thickness of the semi-solid electrode material on the current collector 210 based upon the z-directional height of the endo frame.

In some embodiments, the stencil 220 can include two endo frames with a first endo frame 220a disposed directly onto the current collector 210 or onto the masking material disposed onto the current collector 210, and a second endo frame 220b can be disposed onto the first endo frame 220a.

The method 20 further includes depositing the semi-solid electrode material into the cavity and, optionally, spreading the semi-solid electrode material evenly across the current collector foil, at 22. In some embodiments, depositing the semi-solid electrode material onto the current collector 210 can form a semi-solid electrode material 230a having a first composition. In some embodiments, dispensing the semi-solid electrode material can include drop-casting the material onto a moving current collector to form or substantially form the intermediate electrode. In some embodiments, dispensing the semi-solid electrode material can include extruding the semi-solid electrode material from a moving extrusion nozzle or the like onto a fixed current collector 210. In some embodiments, the semi-solid electrode material can be dispensed via a fixed dispensing mechanism onto a fixed current collector 210, for example, in a discrete portion, and then the discrete portion of semi-solid electrode material can be spread across the surface of the current collector 210 by any suitable method to form or substantially form the intermediate electrode. In some embodiments, a current collector material can be apportioned into a plurality of the current collectors 210 such that each of the plurality of current collectors 210 is separated from the others. Discrete portions of the semi-solid electrode material can then be disposed onto a surface of each of the individualized current collectors 210 to form or substantially form intermediate electrodes. In some embodiments, the intermediate electrode formed according to step 22 of the method 20 includes an intermediary electrode material, e.g., 230a, such that the intermediate electrode could be operable in an electrochemical cell, but which has a lower active solids loading than desired for a finished electrode. The formed intermediate electrode can be a positive electrode, an anode, a negative electrode, a cathode, or any other electrode or component of an electrochemical cell. As described herein, the electrode can be a semi-solid electrode including at least an active material and/or a conductive material in a liquid electrolyte.

In some embodiments, the semi-solid electrode material can be smoothed or spread along the surface of the exposed portion of the current collector 210. In some embodiments, a blade (also referred to herein as "doctor blade") or other straight edged instrument can be used to spread the semi-solid electrode material. In some embodiments, the blade and/or the endo frame can be operably coupled to a vibration source to vibrate the blade or the endo frame during semi-solid electrode material deposition or smoothing. The vibration may facilitate dispersion of the semi-solid electrode material during or after the semi-solid electrode material deposition step.

The method 20 further includes removing the stencil, at 23, to define the electrode and form the edges of the electrode. In some embodiments, step 23 can include removing the endo frame, the masking material, or both. In some embodiments, removing the stencil material can result in an intermediate electrode having cleaner edges with less, substantially no, or no edge crumble. In some embodiments, a part of the stencil, for example a top layer or a top half of the stencil, can be removed and the bottom layer or bottom half can remain in place on the current collector 210.

In some embodiments, once the stencil or a portion thereof has been removed, the intermediate electrode can be weighed and/or the thickness of the intermediate electrode can be measured. In some embodiments, the weight of the intermediate electrode can be compared to a predetermined weight desired for the intermediate electrode. In some embodiments, the thickness (e.g., in the z-direction) of the intermediate electrode can be compared to a predetermined thickness desired for the intermediate electrode. In some embodiments, the predetermined weight and/or predetermined thickness can be a first weight or a first thickness.

The method 20 further includes placing the electrode into the mechanical press and applying compressive force to extract a portion of the electrolyte from the semi-solid electrode material, at 24. In some embodiments, the mechanical press can include a base 250*a* and a die 250*b* wherein moving the base and/or the die supplies a compressive force, F, to the intermediate electrode sufficient to extract a portion of the electrolyte from the semi-solid electrode material 230*a*. In some embodiments, the mechanical press can include a press guide 260, such as a channel or a plurality of walls, such that the movement of the base 250*a* and/or the die 250*b* during mechanical pressing can be controlled. In some embodiments, once the portion of electrolyte has been removed through mechanical compression of the intermediate electrode, the electrode can include a semi-solid electrode material 230*b* having a second composition wherein the ratio of active material to electrolyte is higher than when the semi-solid electrode material 230*a* has the first composition.

In some embodiments, at least one of the base 250*a* and the die 250*b* can include a cavity such that, during mechanical compression of the intermediate electrode, the removed electrolyte or a portion thereof can be held within or communicated through the cavity. In some embodiments, during mechanical compression of the intermediate electrode, the removed electrolyte or a portion thereof can be communicated out of the semi-solid electrode material, through a porous current collector, and into or through the cavity. In some embodiments, the removed electrolyte or a portion thereof can be communicated out of the semi-solid electrode material, around the ends or edges of the current collector, and out from between the base and the die. In some embodiments, the removed electrolyte or a portion thereof can be communicated out of the semi-solid electrode material in a direction opposite the current collector 210, and into or through the cavity. In some embodiments, the removed electrolyte or a portion thereof can be communicated out of the semi-solid electrode material 230*a* via more than one of the pathways described herein. In some embodiments, the cavity can be fluidically coupled to a drain such that removed electrolyte communicated into or through the cavity can be removed from the mechanical press via the drain. In some embodiments, the cavity can be fluidically coupled to a reservoir such that removed electrolyte communicated into or through the cavity can be removed from the mechanical press via the reservoir. In some embodiments, removed electrolyte held in the reservoir may be reusable and/or recyclable for use in other semi-solid electrodes or elsewhere.

In some embodiments, a semi-permeable membrane (not shown) can be disposed on or about the semi-solid electrode material such that, during mechanical compression of the intermediate electrode, the semi-permeable membrane allows the communication of electrolyte out of the semi-solid electrode material while disallowing the communication of active material, conductive material, or the like out of the semi-solid electrode material. In some embodiments, the semi-permeable membrane can be a sheet or other planar structure configured to be removed from on or about the semi-solid electrode material before or after removing the intermediate electrode from the mechanical press and before incorporating the mechanically compressed electrode into an electrochemical cell or the like. In some embodiments, the semi-permeable membrane can be a conventional separator material configured to allow at least some flux of liquid electrolyte therethrough. In some embodiments, the semi-permeable membrane can be any material that allows at least some flux of liquid electrolyte therethrough while being completely or substantially chemically inert with regard to the composition of the semi-solid electrode material 230*a* and/or the current collector 210. In some embodiments, the semi-permeable membrane can remain on or about the semi-solid electrode material throughout mechanical compression and construction of the electrochemical cell, such that the semi-permeable membrane is included in the finished electrochemical cell.

In some embodiments, an absorptive material 240 can be disposed between a portion of the intermediate electrode and a component of the mechanical press before mechanically pressing the intermediate electrode, e.g., at 24. In some embodiments, the absorptive material 240 can be disposed within the mechanical press, for example between the intermediate electrode and at least one of the die 250*b* and the base 250*a*, to absorb at least a portion of the electrolyte removed from the intermediate electrode. In some embodiments, the absorptive material 240 can include any of a fiber material, cotton fibers, rice husks, superhydrophobic sawdust, a cellulose-based material, a super-absorbing polymer, a zeolite material, aerogels, nanocellulose aerogels, hydrogels, polyurethane, polypropylene, polyethylene, and cross-linked polymers, nanoparticles, carbon nanotubes, poly(dimethylsiloxane), sepiolite, talc, montmorillonite, mixture of sphagnum peat moss, charcoal, and sawdust, combinations thereof, and the like.

In some embodiments, the absorptive material 240 can be used in addition to the base and/or the die having the cavity. In some embodiments, absorptive material 240 can be used instead of the base and/or the die having the cavity. In some embodiments, the cavity can be at least partially filled with the absorptive material such that when the extracted electrolyte is communicated into the cavity, the absorptive material 240 can capture all, substantially all, most, some, or a portion of the extracted electrolyte against reabsorption of at least that portion back into the semi-solid electrode material 230*b*. In some embodiments, the absorptive material 240 can be positioned such that when the extracted electrolyte or a portion thereof is communicated through the cavity, for example, through the cavity and into the reservoir or drain fluidically coupled thereto, the absorptive material 240 can capture all, substantially all, most, some, or a portion of the extracted electrolyte against communication of at least that portion back into the cavity and/or reabsorption of at least that portion back into the semi-solid electrode material 230b. In some embodiments, the absorptive material 240 can be positioned about the edges of the base 250a, the die 250b, and/or the intermediate electrode such that any portion of the electrolyte that is removed from the semi-solid electrode material 230a via the edges of the intermediate electrode can be captured, substantially captured, or at least partially captured by the absorptive material 240. In some embodiments, the absorptive material 240 can be interposed between the die 250b or the base 250a and the semi-permeable membrane. In some embodiments, the absorptive material 240 can be interposed between the porous current collector 210 and the base 250a or the die 250b. In some embodiments, the absorptive material 240 can be positioned in more than one of the configurations described herein, for example, absorptive material 240 can be placed between the base 250a and the current collector 210, between the die 250b and the semi-permeable membrane that is positioned on the exposed surface of the semi-solid electrode material 230a, and about the edges of the intermediate electrode such that all or substantially all of the removed excess electrolyte can be captured by the absorptive material 240.

The method 20 further includes disassembling the mechanical press assembly and removing the absorptive material 240, the semi-permeable membrane, and/or any remaining stencil material (e.g., first endo frame 220a) to form the finished semi-solid electrode having a higher active solids loading. In some embodiments, removing the portion of electrolyte from the intermediate electrode forms a finished electrode having higher active solids loading than previously described semi-solid electrode materials and electrodes comprised thereof. Without wishing to be bound by any particular theory, removing a portion of the electrolyte (e.g., an excess portion of a liquid electrolyte) can reduce the volume of the semi-solid electrode material on the current collector by removing electrolyte and through compressive removal of voids and porosity, without a corresponding reduction in conductivity across the semi-solid electrode material. In some embodiments, the reduction in porosity can include a reduction in porosity from about between about 20% and about 50% to between about 5% and about 30%, inclusive of all values and ranges therebetween.

In some embodiments, the first composition of the semi-solid electrode material 230a can include about 20% to about 80% by volume of an active material. In some embodiments the first composition of the semi-solid electrode material 230a can include about 40% to about 80% by volume, or 50% to about 80% by volume of an active material. In some embodiments, the first composition of the semi-solid electrode material 230a can include at least about 20%, at least about 25%, at least about 30%, at least about 35%, at least about 40%, at least about 45%, at least about 50%, at least about 55%, at least about 60%, at least about 65%, at least about 70%, or at least about 75% by volume of an active material. In some embodiments, the first composition of the semi-solid electrode material 230a can include no more than about 80%, no more than about 75%, no more than about 70%, no more than about 65%, no more than about 60%, no more than about 55%, no more than about 50%, no more than about 45%, no more than about 40%, no more than about 35%, no more than about 30%, or no more than about 25% by volume of an active material. Combinations of the above-referenced volume percentages of active material in the first composition of the semi-solid electrode material 230a are also possible (e.g., at least about 20% by volume and no more than about 80% by volume or at least about 30% by volume and no more than about 60% by volume), inclusive of all values and ranges therebetween.

In some embodiments, the first composition of the semi-solid electrode material 230a can include about 20%, about 25%, about 30%, about 35%, about 40%, about 45%, about 50%, about 55%, about 60%, about 65%, about 70%, about 75%, or about 80% by volume of an active material.

In some embodiments, the first composition of the semi-solid electrode material 230a can include about 0.5% to about 25% by volume of a conductive material. In some embodiments, the first composition of the semi-solid electrode material 230a can include about 1.0% to about 6% by volume of a conductive material. In some embodiments, the first composition of the semi-solid electrode material 230a can include at least about 0.5%, at least about 1%, at least about 1.5%, at least about 2%, at least about 2.5%, at least about 3%, at least about 3.5%, at least about 4%, at least about 4.5%, at least about 5%, at least about 5.5%, at least about 6%, at least about 6.5%, at least about 7%, at least about 7.5%, at least about 8%, at least about 8.5%, at least about 9%, at least about 9.5%, at least about 10%, at least about 15%, or at least about 20% by volume of a conductive material. In some embodiments, the first composition of the semi-solid electrode material 230a can include no more than about 25%, no more than about 20%, no more than about 15%, no more than about 10%, no more than about 9.5%, no more than about 9%, no more than about 8.5%, no more than about 8%, no more than about 7.5%, no more than about 7%, no more than about 6.5%, no more than about 6%, no more than about 5.5%, no more than about 5%, no more than about 4.5%, no more than about 4%, no more than about 3.5%, no more than about 3%, no more than about 2.5%, no more than about 2%, no more than about 1.5%, or no more than about 1% by volume of a conductive material. Combinations of the above-referenced volume percentages of conductive material in the first composition of the semi-solid electrode material 230a are also possible (e.g., at least about 0.5% by volume and no more than about 25% by volume or at least about 3% by volume and no more than about 10% by volume), inclusive of all values and ranges therebetween. In some embodiments, the first composition of the semi-solid electrode material 230a can include about 0.5%, about 1%, about 1.5%, about 2%, about 2.5%, about 3%, about 3.5%, about 4%, about 4.5%, about 5%, about 5.5%, about 6%, about 6.5%, about 7%, about 7.5%, about 8%, about 8.5%, about 9%, about 9.5%, about 10%, about 15%, about 20%, or about 25% by volume of a conductive material.

In some embodiments, the first composition of the semi-solid electrode material 230a can include about 25% to about 70% by volume of an electrolyte. In some embodiments, the first composition of the semi-solid electrode material 230a can include about 30% to about 50%, or about 20% to about 40% by volume of an electrolyte. In some embodiments, the first composition of the semi-solid electrode material 230a can include at least about 25%, at least about 30%, at least about 35%, at least about 40%, at least about 45%, at least about 50%, at least about 55%, at least about 60%, or at least about 65% by volume of an electrolyte. In some embodiments, the first composition of the semi-solid electrode material 230a can be no more than about 70%, no more than about 65%, no more than about 60%, no more than about 55%, no more than about 50%, no more than about 45%, no more than about 40%, no more than about 35%, or no more than about 30% by volume of an electrolyte. Combinations of the above-referenced volume percentages of electrolyte in the first composition of the semi-solid electrode material 230a are also possible (e.g., at least about 25% and no more than about 70% or at least about 30% and no more than about 50%), inclusive of all values and ranges therebetween. In some embodiments, the first composition of the semi-solid electrode material 230a can include about 25%, about 30%, about 35%, about 40%, about 45%, about 50%, about 55%, about 60%, about 65%, or about 70% by volume of an electrolyte.

In some embodiments, the second composition of the semi-solid electrode material 230b can include about 30% to about 85% by volume of an active material. In some embodiments the second composition of the semi-solid electrode material 230b can include about 50% to about 85% by volume, or 60% to about 85% by volume of an active material. In some embodiments, the second composition of the semi-solid electrode material 230b can include at least about 30%, at least about 35%, at least about 40%, at least about 45%, at least about 50%, at least about 55%, at least about 60%, at least about 65%, at least about 70%, at least about 75%, or at least about 80% by volume of an active material. In some embodiments, the second composition of the semi-solid electrode material 230b can include no more than about 85%, no more than about 80%, no more than about 75%, no more than about 70%, no more than about 65%, no more than about 60%, no more than about 55%, no more than about 50%, no more than about 45%, no more than about 40%, or no more than about 35% by volume of an active material. Combinations of the above-referenced volume percentages of active material in the second composition of the semi-solid electrode material 230b are also possible (e.g., at least about 30% by volume and no more than about 85% by volume or at least about 40% by volume and no more than about 70% by volume), inclusive of all values and ranges therebetween. In some embodiments, the second composition of the semi-solid electrode material 230b can include about 30%, about 35%, about 40%, about 45%, about 50%, about 55%, about 60%, about 65%, about 70%, about 75%, about 80%, or about 85% by volume of an active material.

In some embodiments, the second composition of the semi-solid electrode material 230b can include about 0.5% to about 30% by volume of a conductive material. In some embodiments, the second composition of the semi-solid electrode material 230b can include about 1.0% to about 6% by volume of a conductive material. In some embodiments, the second composition of the semi-solid electrode material 230b can include at least about 0.5%, at least about 1%, at least about 1.5%, at least about 2%, at least about 2.5%, at least about 3%, at least about 3.5%, at least about 4%, at least about 4.5%, at least about 5%, at least about 5.5%, at least about 6%, at least about 6.5%, at least about 7%, at least about 7.5%, at least about 8%, at least about 8.5%, at least about 9%, at least about 9.5%, at least about 10%, at least about 15%, at least about 20%, or at least about 25% by volume of a conductive material. In some embodiments, the second composition of the semi-solid electrode material 230b can include no more than about 30%, no more than about 25%, no more than about 20%, no more than about 15%, no more than about 10%, no more than about 9.5%, no more than about 9%, no more than about 8.5%, no more than about 8%, no more than about 7.5%, no more than about 7%, no more than about 6.5%, no more than about 6%, no more than about 5.5%, no more than about 5%, no more than about 4.5%, no more than about 4%, no more than about 3.5%, no more than about 3%, no more than about 2.5%, no more than about 2%, no more than about 1.5%, or no more than about 1% by volume of a conductive material. Combinations of the above-referenced volume percentages of conductive material in the second composition of the semi-solid electrode material 230b are also possible (e.g., at least about 0.5% by volume and no more than about 30% by volume or at least about 5% by volume and no more than about 10% by volume), inclusive of all values and ranges therebetween. In some embodiments, the second composition of the semi-solid electrode material 230b can include about 0.5%, about 1%, about 1.5%, about 2%, about 2.5%, about 3%, about 3.5%, about 4%, about 4.5%, about 5%, about 5.5%, about 6%, about 6.5%, about 7%, about 7.5%, about 8%, about 8.5%, about 9%, about 9.5%, about 10%, about 15%, about 20%, about 25%, or about 30% by volume of a conductive material.

In some embodiments, the second composition of the semi-solid electrode material 230b can include about 15% to about 60% by volume of an electrolyte. In some embodiments, the second composition of the semi-solid electrode material 230b can include about 20% to about 40%, or about 10% to about 30% by volume of an electrolyte. In some embodiments, the second composition of the semi-solid electrode material 230b can include at least about 15%, at least about 20%, at least about 25%, at least about 30%, at least about 35%, at least about 40%, at least about 45%, at least about 50%, or at least about 55% by volume of an electrolyte. In some embodiments, the second composition of the semi-solid electrode material 230b can be no more than about 60%, no more than about 55%, no more than about 50%, no more than about 45%, no more than about 40%, no more than about 35%, no more than about 30%, no more than about 25%, or no more than about 20% by volume of an electrolyte. Combinations of the above-referenced volume percentages of electrolyte in the second composition of the semi-solid electrode material 230b are also possible (e.g., at least about 15% and no more than about 60% or at least about 20% and no more than about 40%), inclusive of all values and ranges therebetween. In some embodiments, the second composition of the semi-solid electrode material 230b can include about 15%, about 20%, about 25%, about 30%, about 35%, about 40%, about 45%, about 50%, about 55%, or about 60% by volume of an electrolyte.

In some embodiments, the second composition of the semi-solid electrode material 230b can have a ratio of electrolyte to active material less than the first composition of the semi-solid electrode material 230a. In some embodiments, the second composition of the semi-solid electrode material 230b can have a v/v ratio of electrolyte to active material between about 5:1 and about 1:6, about 5:1 and about 1:5, about 5:1 and about 1:4, about 5:1 and about 1:3, about 4:1 and about 1:2, about 3:1 and about 1:1, about 5:1 and about 1:2, about 5:1 and about 1:1, about 5:1 and about 2:1, about 5:1 and about 3:1, about 5:1 and about 4:1, about 4:1 and about 1:3, about 3:1 and about 1:3, about 2:1 and about 1:3, about 1:1 and about 1:3, about 1:2 and about 1:3, about 1:2 and about 1:4, about 1:2 and about 1:5, about 1:2 and about 1:6, about 1:3 and about 1:6, about 1:4 and about 1:6, or about 1:5 and about 1:6, inclusive of all values and ranges therebetween.

In some embodiments, the weight and/or thickness of the semi-solid electrode can be measured at various points throughout the process of mechanically pressing the intermediate electrode to form the finished electrode. For example, in some embodiments, the weight of the finished electrode can be a second weight and can be compared to the first weight to determine the mass of the electrolyte that was removed during mechanically pressing. In some embodiments, the thickness of the finished electrode can be a second thickness and can be compared to the first thickness to determine the volume of the electrolyte that was removed during mechanically pressing. In some embodiments, if the difference between the first and second weight or the first and second thickness of the semi-solid electrode material 230*b* is not sufficient, an absorptive material 240 and/or semi-permeable membrane can be disposed back onto the semi-solid electrode and the intermediate electrode can be further mechanically compressed to remove a second portion of electrolyte from the semi-solid electrode material 230*b*. In some embodiments, the volume or mass of electrolyte removed during mechanically pressing can be used to determine the relative volume or mass percentages of the active material, conductive material, and electrolyte in the semi-solid electrode material 230*b*.

In some embodiments, once the composition of the semi-solid electrode material 230*b* matches or substantially matches the desired composition of the semi-solid electrode material 230*b* in the finished electrode, the electrode can be removed from the mechanical press. In some embodiments, the electrode can be weighed before being mechanically pressed, can then be mechanically pressed for a first time period to remove a first portion of the electrolyte, and then weighed again, the difference between the first weight and the second weight operable to determine the mass of electrolyte removed. If the mass of electrolyte removed corresponds sufficiently with the desired volume or mass of electrolyte to be removed, then the electrode can be considered a finished electrode and is ready for further processing or incorporation into an electrochemical cell (not shown). If the mass of electrolyte removed does not correspond sufficiently with the desired volume or mass of electrolyte to be removed, then the electrode can be mechanically pressed for a second time period to remove a second portion of the electrolyte, and then weighed a third time, the different between the second weight and the third weight operable to determine the mass of electrolyte removed during the second time period. If the mass of electrolyte removed during the first time period plus the mass of electrolyte removed during the second time period equals or substantially equals the desired mass of electrolyte to be removed from the semi-solid electrode material, then the electrode can be considered a finished electrode. Mechanical compression of the intermediate electrode can continue in this iterative manner until the total volume or mass of electrolyte removed equals or substantially equals the desired volume or mass of electrolyte to be removed.

In some embodiments, the finished electrode can include an electrode tab electrically connected to the current collector and configured to transport electrons into or out of the electrode. In some embodiments, the electrode tab can extend beyond the current collector and/or the insulating material. In some embodiments, the electrode tab can be electrically coupled to the current collector before the semi-solid electrode material is disposed onto the current collector. In some embodiments, the cell can include integrated electrical tabbing, which can obviate the need for (i) a discrete tab component (e.g., an electrical lead), (ii) connecting dedicated tabs to current collectors, and (iii) a dedicated tab sealing operation. Instead, in some embodiments, an electrical tab or lead can be provided as an extension of the current collector integral to the current collector. In some embodiments, the tab or lead can be defined by removal of material from a larger area of current collector material, thereby defining the current collector and the tab or lead.

The method 20 optionally includes joining the finished electrode (e.g., cathode) with a second finished electrode (e.g., anode), interposed with a separator, to form a finished electrochemical cell. In other words, once the finished electrode has been individualized and excess electrolyte has been removed, the finished electrode can be assembled into the electrochemical cell with the second finished electrode exhibiting the opposite redox reaction. In other words, the cathode and the anode can be joined together with a separator disposed between.

In some embodiments, the separator can be disposed between the anode and the cathode. In some embodiments, the separator can be joined to at least one of the anode and the cathode with an adhesive. In some embodiments, one anode, one cathode and one separator can be stacked together to form a unit cell assembly. Each unit cell assembly can also include conductive tabs (also referred to as a lead) to couple the electrodes to external circuits. Multiple unit cell assemblies are then stacked or arrayed together to form a battery cell. In some embodiments, the number of unit cell assemblies in a battery cell may vary depending on, for example, the desired capacity and/or thickness of the resulting battery cell. These stacked unit cell assemblies are electrically in parallel, and respective tabs in each unit cell assembly are typically welded together via welding processes such as resistance welding, laser welding, and ultrasonic welding, seam welding, electric beam welding, among others.

In some embodiments, the prepared electrochemical cell can be vacuum sealed in a prismatic pouch which can provide hermetic isolation of the electrochemical cell materials from the environment. Thus, the pouch can serve to avoid leakage of hazardous materials such as electrolyte solvents and/or corrosive salts to the ambient environment, and can prevent water and/or oxygen infiltration into the cell. Other functions of the pouch can include, for example, compressive packaging of the internal layers, voltage isolation for safety and handling, and mechanical protection of the electrochemical cell assembly. In some embodiments, during vacuum pouch sealing, electrolyte can be injected into the stacked unit cell assembly and the unit cell assemblies and the electrolyte can then be sealed into a pouch. In some embodiments, no electrolyte is added during the pouch sealing step if the semi-solid electrode material may contain the total desired quantity of electrolyte already.

In some embodiments, the sealed battery cell can then be subjected to a formation process, in which an initial charging operation can be performed to create a stable SEI layer that can passivate the electrode-electrolyte interface as well as prevent side reactions. In some embodiments, several cycles of charging and discharging can be carried out to ensure that the capacity of the batteries meets the required specifications. In some embodiments, a degassing step can be performed to release gases introduced or produced during the initial charging stage or during the electrochemical reactions in the battery formation step. The presence of entrapped gas in the electrodes generally reduces the conductivity and density of the electrodes, and limits the amount of active electrochemical materials that can be placed in a battery cell and may cause dendrite growth that can erode battery performance in lithium batteries. In some embodiments, dendrite formation may lead to a reduction in cycle life and a reduction in overall safety performance. In some embodiments, a reseal step can be taken to seal the battery cell again after the entrapped gas is released.

FIGS. 3A-3E illustrate a method 30 of forming a semi-solid electrode material having a higher active material concentration and a higher energy density without requiring an electrolyte infusion step and/or a drying step. The method 30 includes forming an intermediate electrode by first disposing a stencil 320*a*, 320*b* (collectively "stencil 320"), onto a current collector 310 (e.g., a foil current collector), at 31. The current collector 310 can be any suitably conductive material configured to transport ions/electrons between the electrode material and a source or a sink. In some embodiments, the stencil 320 can include any material impermeable to transport of a semi-solid electrode material therethrough. In some embodiments, the stencil 320 can be dimensioned and configured to extend about or substantially about the current collector 310 circumferentially. In some embodiments, the stencil 320 can have dimensions that are the same or substantially the same as the current collector 310. In some embodiments, the stencil 320 can include a masking material, such as that described in the '483 Application. In some embodiments, the masking material can be a tape or a similar material that can be applied onto the current collector 310 or about the current collector 310 to contain a semi-solid electrode material during deposition of the semi-solid electrode material onto the current collector 310.

In some embodiments, instead of or in addition to masking material, as described above, the endo frame structure can be disposed onto the current collector 310 before disposing the semi-solid electrode material onto the current collector 310. In some embodiments, the endo frame can hold the current collector 310 in place or substantially in place during deposition of the semi-solid electrode material. In some embodiments, the endo frame can have at least some z-directional thickness such that the endo frame at least partially defines an inner region into which the semi-solid electrode material can be disposed and retained on the surface of the current collector 310.

In some embodiments, the endo frame can at least partially define the surface area of the finished electrode (e.g., as the interior extents of the endo frame). In some embodiments, the endo frame can at least partially define the thickness of the semi-solid electrode material on the current collector 310 based upon the z-directional height of the endo frame.

In some embodiments, the stencil 320 can include two endo frames with a first endo frame 320a disposed directly onto the current collector 310 or onto the masking material disposed onto the current collector 310, and a second endo frame 320b can be disposed onto the first endo frame 320a.

The method 30 further includes depositing the semi-solid electrode material into the cavity and, optionally, spreading the semi-solid electrode material evenly across the current collector foil, at 32. In some embodiments, depositing the semi-solid electrode material onto the current collector 310 can form a semi-solid electrode material 330a having a first composition. In some embodiments, dispensing the semi-solid electrode material can include drop-casting the semi-solid electrode material onto a moving current collector to form or substantially form the intermediate electrode. In some embodiments, dispensing the semi-solid electrode material can include extruding the semi-solid electrode material from a moving extrusion nozzle or the like onto a fixed current collector 310. In some embodiments, the semi-solid electrode material can be dispensed via a fixed dispensing mechanism onto a fixed current collector 310, for example, in a discrete portion, and then the discrete portion of the semi-solid electrode material can be spread across the surface of the current collector 310 by any suitable method to form or substantially form the intermediate electrode. In some embodiments, a current collector material can be apportioned into a plurality of the current collectors 310 such that each of the plurality of current collectors 310 is separated from the others. Discrete portions of the semi-solid electrode material can then be disposed onto a surface of each of the individualized current collectors 310 to form or substantially form intermediate electrodes. In some embodiments, the intermediate electrode formed according to step 32 of the method 30 includes an intermediary electrode material, e.g., 330a, such that the intermediate electrode could be operable in an electrochemical cell, but which has a lower active solids loading than desired for a finished electrode. The formed intermediate electrode can be a positive electrode, an anode, a negative electrode, a cathode, or any other electrode or component of an electrochemical cell. As described herein, the electrode can be a semi-solid electrode including at least an active material and/or a conductive material in a liquid electrolyte.

In some embodiments, the semi-solid electrode material can be smoothed or spread along the surface of the exposed portion of the current collector 310. In some embodiments, a blade (also referred to herein as "doctor blade") or other straight edged instrument can be used to spread the semi-solid electrode material. In some embodiments, the blade and/or the endo frame can be operably coupled to a vibration source to vibrate the blade or the endo frame during semi-solid electrode material deposition or smoothing. The vibration may facilitate dispersion of the semi-solid electrode material during or after the semi-solid electrode material deposition step.

The method 30 further includes removing the stencil, at 33, to define the electrode and form the edges of the electrode. In some embodiments, step 33 can include removing the endo frame, the masking material, or both. In some embodiments, removing the stencil material can result in an intermediate electrode having cleaner edges with less, substantially no, or no edge crumble. In some embodiments, a part of the stencil, for example a top layer or a top half of the stencil, can be removed and the bottom layer or bottom half can remain in place on the current collector 310.

In some embodiments, once the stencil or a portion thereof has been removed, the intermediate electrode can be weighed and/or the thickness of the intermediate electrode can be measured. In some embodiments, the weight of the intermediate electrode can be compared to a predetermined weight desired for the intermediate electrode. In some embodiments, the thickness (e.g., in the z-direction) of the intermediate electrode can be compared to a predetermined thickness desired for the intermediate electrode. In some embodiments, the predetermined weight and/or predetermined thickness can be a first weight or a first thickness.

The method 30 further includes applying compressive force, F, to extract a portion of the electrolyte from the semi-solid electrode material, at 34. In some embodiments, the compressive force can be applied to the semi-solid electrode material via a roller or the like. As shown, the roller rotates along direction R. In some embodiments, the roller can be moved across a surface of a fixed intermediate electrode to apply the compressive force, F. In some embodiments, the intermediate electrode can be positioned on a base (not shown) and the roller can be moved across the surface of the fixed intermediate electrode. In some embodiments, the intermediate electrode can be moved through, past, or under the roller such that the roller can apply the compressive force, F. In some embodiments, the intermediate electrode can be conveyed along a conveyor under the roller. In some embodiments, the intermediate electrode can be moved through a plurality of rollers such that the rollers apply the compressive force, F. In some embodiments, once the portion of electrolyte has been removed through mechanical compression of the intermediate electrode, the electrode can include a semi-solid electrode material 330b having a second composition wherein the ratio of active material to electrolyte is higher than when the semi-solid electrode material 330*a* has the first composition.

In some embodiments, the base, the roller, one of the plurality of rollers, and/or each of the plurality of rollers can include a cavity such that, during mechanical compression of the intermediate electrode, the removed electrolyte or a portion thereof can be held within or communicated through the cavity. In some embodiments, during mechanical compression of the intermediate electrode, the removed electrolyte or a portion thereof can be communicated out of the semi-solid electrode material, through a porous current collector, and into or through the cavity. In some embodiments, the removed electrolyte or a portion thereof can be communicated out of the semi-solid electrode material, around the ends or edges of the current collector, and out from between the base and the roller or the plurality of rollers. In some embodiments, the removed electrolyte or a portion thereof can be communicated out of the semi-solid electrode material in a direction opposite the current collector 310, and into or through the cavity. In some embodiments, the removed electrolyte or a portion thereof can be communicated out of the semi-solid electrode material 330*a* via more than one of the pathways described herein. In some embodiments, the cavity can be fluidically coupled to a drain such that removed electrolyte communicated into or through the cavity can be removed from the mechanical press via the drain. In some embodiments, the cavity can be fluidically coupled to a reservoir such that removed electrolyte communicated into or through the cavity can be removed from the mechanical press via the reservoir. In some embodiments, removed electrolyte held in the reservoir may be reusable and/or recyclable for use in other semi-solid electrodes or elsewhere.

In some embodiments, a semi-permeable membrane (not shown) can be disposed on or about the semi-solid electrode material such that, during mechanical compression of the intermediate electrode, the semi-permeable membrane allows the communication of electrolyte out of the semi-solid electrode material while disallowing the communication of active material, conductive material, or the like out of the semi-solid electrode material. In some embodiments, the semi-permeable membrane can be a sheet or other planar structure configured to be removed from on or about the semi-solid electrode material before or after removing the intermediate electrode from the mechanical press and before incorporating the mechanically compressed electrode into an electrochemical cell or the like. In some embodiments, the semi-permeable membrane can be a conventional separator material configured to allow at least some flux of liquid electrolyte therethrough. In some embodiments, the semi-permeable membrane can be any material that allows at least some flux of liquid electrolyte therethrough while being completely or substantially chemically inert with regard to the composition of the semi-solid electrode material and/or the current collector 310. In some embodiments, the semi-permeable membrane can remain on or about the semi-solid electrode material throughout mechanical compression and construction of the electrochemical cell, such that the semi-permeable membrane is included in the finished electrochemical cell.

In some embodiments, an absorptive material 340 can be disposed between a portion of the intermediate electrode and at least one of the base, the roller, or the plurality of rollers before mechanically pressing the intermediate electrode, e.g., at 34. In some embodiments, the absorptive material 340 can be disposed between the intermediate electrode and the roller to absorb at least a portion of the electrolyte removed from the intermediate electrode. In some embodiments, the absorptive material 340 can include any of a fiber material, cotton fibers, rice husks, superhydrophobic sawdust, a cellulose-based material, a super-absorbing polymer, a zeolite material, aerogels, nanocellulose aerogels, hydrogels, polyurethane, polypropylene, polyethylene, and cross-linked polymers, nanoparticles, carbon nanotubes, poly(dimethylsiloxane), sepiolite, talc, montmorillonite, mixture of sphagnum peat moss, charcoal, and sawdust, combinations thereof, and the like.

In some embodiments, the absorptive material 340 can be used in addition to the base, the roller, and/or the plurality of rollers having the cavity or cavities. In some embodiments, absorptive material 340 can be used instead of the base, the roller, and/or the plurality of rollers having the cavity or cavities. In some embodiments, the absorptive material 340 can be circulated via multiple rollers. In other words, two or more rollers (or a roller and a pivot point) can keep a flat side of the absorptive material 340 in contact with the semi-solid electrode material 330*a*. In some embodiments, the absorptive material 340 can remove electrolyte from the semi-solid electrode 330*a* in a continuous or semi-continuous operation. In some embodiments, the absorptive material 340 can be circulated and electrolyte can be removed from the absorptive material 340 at a location spaced apart from the semi-solid electrode 330*a*. In other words, the absorptive material 340 can be "rejuvenated" and recirculated back to contact the semi-solid electrode 330*a*. In some embodiments, the cavity can be at least partially filled with the absorptive material such that when the extracted electrolyte is communicated into the cavity, the absorptive material 340 can capture all, substantially all, most, some, or a portion of the extracted electrolyte against reabsorption of at least that portion back into the semi-solid electrode material 330*b*. In some embodiments, the absorptive material 340 can be positioned such that when the extracted electrolyte or a portion thereof is communicated through the cavity, for example, through the cavity and into the reservoir or drain fluidically coupled thereto, the absorptive material 340 can capture all, substantially all, most, some, or a portion of the extracted electrolyte against communication of at least that portion back into the cavity and/or reabsorption of at least that portion back into the semi-solid electrode material 330*b*. In some embodiments, the absorptive material 340 can be positioned about the edges of the base, the roller or plurality of rollers, and/or the intermediate electrode such that any portion of the electrolyte that is removed from the semi-solid electrode material 330*a* via the edges of the intermediate electrode can be captured, substantially captured, or at least partially captured by the absorptive material 340. In some embodiments, the absorptive material 340 can be interposed between the roller or the base and the semi-permeable membrane. In some embodiments, the absorptive material 340 can be interposed between the porous current collector 310 and the base or the roller. In some embodiments, the absorptive material 340 can be positioned in more than one of the configurations described herein, for example, absorptive material 340 can be placed between the base and the current collector 310, between the roller or plurality of rollers and the semi-permeable membrane that is positioned on the exposed surface of the semi-solid electrode material 330*a*, and about the edges of the intermediate electrode such that all or substantially all of the removed excess electrolyte can be captured by the absorptive material 340.

The method 30 further includes removing the roller or removing the pressed electrode from the roller assembly and removing the absorptive material 340, the semi-permeable membrane, and/or any remaining stencil material (e.g., first endo frame 320a) to form the finished semi-solid electrode having a higher active solids loading. In some embodiments, removing the portion of electrolyte from the intermediate electrode forms a finished electrode having higher active solids loading than previously described semi-solid electrode materials and electrodes comprised thereof. Without wishing to be bound by any particular theory, removing a portion of the electrolyte (e.g., an excess portion of a liquid electrolyte) can reduce the volume of the semi-solid electrode material on the current collector by removing electrolyte and through compressive removal of voids and porosity, without a corresponding reduction in conductivity across the semi-solid electrode material. In some embodiments, the reduction in porosity can include a reduction in porosity from between about 20% and about 50% to between about 5% and about 30%, inclusive of all values and ranges therebetween.

In some embodiments, the first composition of the semi-solid electrode material 330a can include about 20% to about 80% by volume of an active material. In some embodiments the first composition of the semi-solid electrode material 330a can include about 40% to about 80% by volume, or 50% to about 80% by volume of an active material. In some embodiments, the first composition of the semi-solid electrode material 330a can include at least about 20%, at least about 25%, at least about 30%, at least about 35%, at least about 40%, at least about 45%, at least about 50%, at least about 55%, at least about 60%, at least about 65%, at least about 70%, or at least about 75% by volume of an active material. In some embodiments, the first composition of the semi-solid electrode material 330a can include no more than about 80%, no more than about 75%, no more than about 70%, no more than about 65%, no more than about 60%, no more than about 55%, no more than about 50%, no more than about 45%, no more than about 40%, no more than about 35%, no more than about 30%, or no more than about 25% by volume of an active material. Combinations of the above-referenced volume percentages of active material in the first composition of the semi-solid electrode material 330a are also possible (e.g., at least about 20% by volume and no more than about 80% by volume or at least about 30% by volume and no more than about 60% by volume), inclusive of all values and ranges therebetween. In some embodiments, the first composition of the semi-solid electrode material 330a can include about 20%, about 25%, about 30%, about 35%, about 40%, about 45%, about 50%, about 55%, about 60%, about 65%, about 70%, about 75%, or about 80% by volume of an active material.

In some embodiments, the first composition of the semi-solid electrode material 330a can include about 0.5% to about 25% by volume of a conductive material. In some embodiments, the first composition of the semi-solid electrode material 330a can include about 1.0% to about 6% by volume of a conductive material. In some embodiments, the first composition of the semi-solid electrode material 330a can include at least about 0.5%, at least about 1%, at least about 1.5%, at least about 2%, at least about 2.5%, at least about 3%, at least about 3.5%, at least about 4%, at least about 4.5%, at least about 5%, at least about 5.5%, at least about 6%, at least about 6.5%, at least about 7%, at least about 7.5%, at least about 8%, at least about 8.5%, at least about 9%, at least about 9.5%, at least about 10%, at least about 15%, or at least about 20% by volume of a conductive material. In some embodiments, the first composition of the semi-solid electrode material 330a can include no more than about 25%, no more than about 20%, no more than about 15%, no more than about 10%, no more than about 9.5%, no more than about 9%, no more than about 8.5%, no more than about 8%, no more than about 7.5%, no more than about 7%, no more than about 6.5%, no more than about 6%, no more than about 5.5%, no more than about 5%, no more than about 4.5%, no more than about 4%, no more than about 3.5%, no more than about 3%, no more than about 2.5%, no more than about 2%, no more than about 1.5%, or no more than about 1% by volume of a conductive material. Combinations of the above-referenced volume percentages of conductive material in the first composition of the semi-solid electrode material 330a are also possible (e.g., at least about 0.5% by volume and no more than about 25% by volume or at least about 3% by volume and no more than about 10% by volume), inclusive of all values and ranges therebetween. In some embodiments, the first composition of the semi-solid electrode material 330a can include about 0.5%, about 1%, about 1.5%, about 2%, about 2.5%, about 3%, about 3.5%, about 4%, about 4.5%, about 5%, about 5.5%, about 6%, about 6.5%, about 7%, about 7.5%, about 8%, about 8.5%, about 9%, about 9.5%, about 10%, about 15%, about 20%, or about 25% by volume of a conductive material.

In some embodiments, the first composition of the semi-solid electrode material 330a can include about 25% to about 70% by volume of an electrolyte. In some embodiments, the first composition of the semi-solid electrode material 330a can include about 30% to about 50%, or about 20% to about 40% by volume of an electrolyte. In some embodiments, the first composition of the semi-solid electrode material 330a can include at least about 25%, at least about 30%, at least about 35%, at least about 40%, at least about 45%, at least about 50%, at least about 55%, at least about 60%, or at least about 65% by volume of an electrolyte. In some embodiments, the first composition of the semi-solid electrode material 330a can be no more than about 70%, no more than about 65%, no more than about 60%, no more than about 55%, no more than about 50%, no more than about 45%, no more than about 40%, no more than about 35%, or no more than about 30% by volume of an electrolyte. Combinations of the above-referenced volume percentages of electrolyte in the first composition of the semi-solid electrode material 330a are also possible (e.g., at least about 25% and no more than about 70% or at least about 30% and no more than about 50%), inclusive of all values and ranges therebetween. In some embodiments, the first composition of the semi-solid electrode material 330a can include about 25%, about 30%, about 35%, about 40%, about 45%, about 50%, about 55%, about 60%, about 65%, or about 70% by volume of an electrolyte.

In some embodiments, the second composition of the semi-solid electrode material 330b can include about 30% to about 85% by volume of an active material. In some embodiments the second composition of the semi-solid electrode material 330b can include about 50% to about 85% by volume, or 60% to about 85% by volume of an active material. In some embodiments, the second composition of the semi-solid electrode material 330b can include at least about 30%, at least about 35%, at least about 40%, at least about 45%, at least about 50%, at least about 55%, at least about 60%, at least about 65%, at least about 70%, at least about 75%, or at least about 80% by volume of an active material. In some embodiments, the second composition of the semi-solid electrode material 330b can include no more than about 85%, no more than about 80%, no more than about 75%, no more than about 70%, no more than about 65%, no more than about 60%, no more than about 55%, no more than about 50%, no more than about 45%, no more than about 40%, or no more than about 35% by volume of an active material. Combinations of the above-referenced volume percentages of active material in the second composition of the semi-solid electrode material 330b are also possible (e.g., at least about 30% by volume and no more than about 85% by volume or at least about 40% by volume and no more than about 70% by volume), inclusive of all values and ranges therebetween. In some embodiments, the second composition of the semi-solid electrode material 330b can include about 30%, about 35%, about 40%, about 45%, about 50%, about 55%, about 60%, about 65%, about 70%, about 75%, about 80%, or about 85% by volume of an active material.

In some embodiments, the second composition of the semi-solid electrode material 330b can include about 0.5% to about 30% by volume of a conductive material. In some embodiments, the second composition of the semi-solid electrode material 330b can include about 1.0% to about 6% by volume of a conductive material. In some embodiments, the second composition of the semi-solid electrode material 330b can include at least about 0.5%, at least about 1%, at least about 1.5%, at least about 2%, at least about 2.5%, at least about 3%, at least about 3.5%, at least about 4%, at least about 4.5%, at least about 5%, at least about 5.5%, at least about 6%, at least about 6.5%, at least about 7%, at least about 7.5%, at least about 8%, at least about 8.5%, at least about 9%, at least about 9.5%, at least about 10%, at least about 15%, at least about 20%, or at least about 25% by volume of a conductive material. In some embodiments, the second composition of the semi-solid electrode material 330b can include no more than about 30%, no more than about 25%, no more than about 20%, no more than about 15%, no more than about 10%, no more than about 9.5%, no more than about 9%, no more than about 8.5%, no more than about 8%, no more than about 7.5%, no more than about 7%, no more than about 6.5%, no more than about 6%, no more than about 5.5%, no more than about 5%, no more than about 4.5%, no more than about 4%, no more than about 3.5%, no more than about 3%, no more than about 2.5%, no more than about 2%, no more than about 1.5%, or no more than about 1% by volume of a conductive material. Combinations of the above-referenced volume percentages of conductive material in the second composition of the semi-solid electrode material 330b are also possible (e.g., at least about 0.5% by volume and no more than about 30% by volume or at least about 5% by volume and no more than about 10% by volume), inclusive of all values and ranges therebetween. In some embodiments, the second composition of the semi-solid electrode material 330b can include about 0.5%, about 1%, about 1.5%, about 2%, about 2.5%, about 3%, about 3.5%, about 4%, about 4.5%, about 5%, about 5.5%, about 6%, about 6.5%, about 7%, about 7.5%, about 8%, about 8.5%, about 9%, about 9.5%, about 10%, about 15%, about 20%, about 25%, or about 30% by volume of a conductive material.

In some embodiments, the second composition of the semi-solid electrode material 330b can include about 15% to about 60% by volume of an electrolyte. In some embodiments, the second composition of the semi-solid electrode material 330b can include about 20% to about 40%, or about 10% to about 30% by volume of an electrolyte. In some embodiments, the second composition of the semi-solid electrode material 330b can include at least about 15%, at least about 20%, at least about 25%, at least about 30%, at least about 35%, at least about 40%, at least about 45%, at least about 50%, or at least about 55% by volume of an electrolyte. In some embodiments, the second composition of the semi-solid electrode material 330b can be no more than about 60%, no more than about 55%, no more than about 50%, no more than about 45%, no more than about 40%, no more than about 35%, no more than about 30%, no more than about 25%, or no more than about 20% by volume of an electrolyte. Combinations of the above-referenced volume percentages of electrolyte in the second composition of the semi-solid electrode material 330b are also possible (e.g., at least about 15% and no more than about 60% or at least about 20% and no more than about 40%), inclusive of all values and ranges therebetween. In some embodiments, the second composition of the semi-solid electrode material 330b can include about 15%, about 20%, about 25%, about 30%, about 35%, about 40%, about 45%, about 50%, about 55%, or about 60% by volume of an electrolyte.

In some embodiments, the second composition of the semi-solid electrode material 330b can have a ratio of electrolyte to active material less than the first composition of the semi-solid electrode material 330a. In some embodiments, the second composition of the semi-solid electrode material 330b can have a ratio of electrolyte to active material between about 5:1 and about 1:3, about 4:1 and about 1:2, about 3:1 and about 1:1, about 5:1 and about 1:2, about 5:1 and about 1:1, about 5:1 and about 2:1, about 5:1 and about 3:1, about 5:1 and about 4:1, about 4:1 and about 1:3, about 3:1 and about 1:3, about 2:1 and about 1:3, about 1:1 and about 1:3, or about 1:2 and about 1:3, inclusive of all values and ranges therebetween.

In some embodiments, the weight and/or thickness of the semi-solid electrode can be measured at various points throughout the process of mechanically pressing the intermediate electrode to form the finished electrode. For example, in some embodiments, the weight of the finished electrode can be a second weight and can be compared to the first weight to determine the mass of the electrolyte that was removed during mechanically pressing. In some embodiments, the thickness of the finished electrode can be a second thickness and can be compared to the first thickness to determine the volume of the electrolyte that was removed during mechanically pressing. In some embodiments, if the difference between the first and second weight or the first and second thickness of the semi-solid electrode material 330b is not sufficient, an absorptive material 340 and/or semi-permeable membrane can be disposed back onto the semi-solid electrode and the intermediate electrode can be further mechanically compressed to remove a second portion of electrolyte from the semi-solid electrode material 330b. In some embodiments, the volume or mass of electrolyte removed during mechanically pressing can be used to determine the relative volume or mass percentages of the active material, conductive material, and electrolyte in the semi-solid electrode material 330b.

In some embodiments, once the composition of the semi-solid electrode material 330b matches or substantially matches the desired composition of the semi-solid electrode material 330b in the finished electrode, the electrode can be removed from the mechanical press. In some embodiments, the electrode can be weighed before being mechanically pressed, can then be mechanically pressed for a first time period to remove a first portion of the electrolyte, and then weighed again, the difference between the first weight and the second weight operable to determine the mass of electrolyte removed. If the mass of electrolyte removed corresponds sufficiently with the desired volume or mass of electrolyte to be removed, then the electrode can be considered a finished electrode and is ready for further processing or incorporation into an electrochemical cell (not shown). If the mass of electrolyte removed does not correspond sufficiently with the desired volume or mass of electrolyte to be removed, then the electrode can be mechanically pressed for a second time period to remove a second portion of the electrolyte, and then weighed a third time, the different between the second weight and the third weight operable to determine the mass of electrolyte removed during the second time period. If the mass of electrolyte removed during the first time period plus the mass of electrolyte removed during the second time period equals or substantially equals the desired mass of electrolyte to be removed from the semi-solid electrode material, then the electrode can be considered a finished electrode. Mechanical compression of the intermediate electrode can continue in this iterative manner until the total volume or mass of electrolyte removed equals or substantially equals the desired volume or mass of electrolyte to be removed.

In some embodiments, the finished electrode can include an electrode tab electrically connected to the current collector and configured to transport electrons into or out of the electrode. In some embodiments, the electrode tab can extend beyond the current collector and/or the insulating material. In some embodiments, the electrode tab can be electrically coupled to the current collector before the semi-solid electrode material is disposed onto the current collector. In some embodiments, the cell can include integrated electrical tabbing, which can obviate the need for (i) a discrete tab component (e.g., an electrical lead), (ii) connecting dedicated tabs to current collectors, and (iii) a dedicated tab sealing operation. Instead, in some embodiments, an electrical tab or lead can be provided as an extension of the current collector integral to the current collector. In some embodiments, the tab or lead can be defined by removal of material from a larger area of current collector material, thereby defining the current collector and the tab or lead.

The method 30 optionally includes joining the finished electrode (e.g., cathode) with a second finished electrode (e.g., anode), interposed with a separator, to form a finished electrochemical cell. In other words, once the finished electrode has been individualized and excess electrolyte has been removed, the finished electrode can be assembled into the electrochemical cell with the second finished electrode exhibiting the opposite redox reaction. In other words, the cathode and the anode can be joined together with a separator disposed between.

In some embodiments, the separator can be disposed between the anode and the cathode. In some embodiments, the separator can be joined to at least one of the anode and the cathode with an adhesive. In some embodiments, one anode, one cathode and one separator can be stacked together to form a unit cell assembly. Each unit cell assembly can also include conductive tabs (also referred to as a lead) to couple the electrodes to external circuits. Multiple unit cell assemblies are then stacked or arrayed together to form a battery cell. In some embodiments, the number of unit cell assemblies in a battery cell may vary depending on, for example, the desired capacity and/or thickness of the resulting battery cell. These stacked unit cell assemblies are electrically in parallel, and respective tabs in each unit cell assembly are typically welded together via welding processes such as resistance welding, laser welding, and ultrasonic welding, seam welding, electric beam welding, among others.

In some embodiments, the prepared electrochemical cell can be vacuum sealed in a prismatic pouch which can provide hermetic isolation of the electrochemical cell materials from the environment. Thus, the pouch can serve to avoid leakage of hazardous materials such as electrolyte solvents and/or corrosive salts to the ambient environment, and can prevent water and/or oxygen infiltration into the cell. Other functions of the pouch can include, for example, compressive packaging of the internal layers, voltage isolation for safety and handling, and mechanical protection of the electrochemical cell assembly. In some embodiments, during vacuum pouch sealing, electrolyte can be injected into the stacked unit cell assembly and the unit cell assemblies and the electrolyte can then be sealed into a pouch. In some embodiments, no electrolyte is added during the pouch sealing step if the semi-solid electrode material may contain the total desired quantity of electrolyte already.

In some embodiments, the sealed battery cell can then be subjected to a formation process, in which an initial charging operation can be performed to create a stable SEI layer that can passivate the electrode-electrolyte interface as well as prevent side reactions. In some embodiments, several cycles of charging and discharging can be carried out to ensure that the capacity of the batteries meets the required specifications. In some embodiments, a degassing step can be performed to release gases introduced or produced during the initial charging stage or during the electrochemical reactions in the battery formation step. The presence of entrapped gas in the electrodes generally reduces the conductivity and density of the electrodes, and limits the amount of active electrochemical materials that can be placed in a battery cell and may cause dendrite growth that can erode battery performance in lithium batteries. In some embodiments, dendrite formation may lead to a reduction in cycle life and a reduction in overall safety performance. In some embodiments, a reseal step can be taken to seal the battery cell again after the entrapped gas is released.

FIGS. 4A-4E illustrate a method 40 of forming a semi-solid electrode material having a higher active material concentration and a higher energy density without requiring an electrolyte infusion step and/or a drying step. The method 40 includes loading a semi-solid electrode material 430a having a first composition into a press 435 at 41. In some embodiments, the press 435 can include a base 436 and a frame 438, wherein the base 436 and the frame 438 form a cavity 439. In some embodiments, the base 436 can include a watertight seal around its edges, such that substantially no semi-solid electrolyte material 430a leaks through the boundary between the base 436 and the frame 438. In some embodiments, the semi-solid electrode material 430a can have the same or substantially similar properties to the semi-solid electrode material 330a as described above, with reference to FIGS. 3A-3E.

In some embodiments, a semi-permeable membrane (not shown) can be disposed on or about the semi-solid electrode material such that, during mechanical compression of the intermediate electrode, the semi-permeable membrane allows the communication of electrolyte out of the semi-solid electrode material while disallowing the communication of active material, conductive material, or the like out of the semi-solid electrode material. In some embodiments, the semi-permeable membrane can be a sheet or other planar structure configured to be removed from on or about the semi-solid electrode material before or after removing the intermediate electrode from the mechanical press and before incorporating the mechanically compressed electrode into an electrochemical cell or the like. In some embodiments, the semi-permeable membrane can be a conventional separator material configured to allow at least some flux of liquid electrolyte therethrough. In some embodiments, the semi-permeable membrane can be any material that allows at least some flux of liquid electrolyte therethrough while being completely or substantially chemically inert with regard to the composition of the semi-solid electrode material 430a and/or the current collector 410. In some embodiments, the semi-permeable membrane can remain on or about the semi-solid electrode material throughout mechanical compression and construction of the electrochemical cell, such that the semi-permeable membrane is included in the finished electrochemical cell.

At 42, the semi-solid electrode material 430a is disposed evenly throughout the cavity 439 of the press 435 to become flush or approximately flush with a top edge of the frame 438. An absorptive material 440 is then placed on the top edge of the frame 438. In some embodiments, the absorptive material 440 can be the same or substantially similar to the absorptive material 340, as described above with reference to FIGS. 3A-3E.

At 43, a force F is applied to the underside of the base 436, to shrink the cavity 439 and extract a portion of electrolyte from the semi-solid electrode material 430a into the absorptive material 440. At 44, once the portion of electrolyte has been removed through mechanical compression of the semi-solid electrode material 430a, the semi-solid electrode material 430a can become a semi-solid electrode wafer 430b having a second composition. The semi-solid electrode wafer 430b has a higher ratio of active material to electrolyte than the semi-solid electrode material 430a. In some embodiments, the cavity 439 can be fluidically coupled to a drain (not shown) such that removed electrolyte communicated into or through the cavity can be removed from the mechanical press via the drain. In some embodiments, the cavity can be fluidically coupled to a reservoir (not shown) such that removed electrolyte communicated into or through the cavity can be removed from the mechanical press via the reservoir. In some embodiments, removed electrolyte held in the reservoir may be reusable and/or recyclable for use in other semi-solid electrodes or elsewhere.

At 45, the semi-solid electrode wafer 430b is removed from the press 435, where it can be used to construct an electrochemical cell or processed further. Removal of the semi-solid electrode wafer 430b from the press 435 can also include removing the absorptive material from contacting the semi-solid electrode wafer 430b. The semi-solid electrode wafer 430b is a versatile, freestanding material that can be applied to a wide array of different applications. In some embodiments, the semi-solid electrode wafer 430b can have compositional properties the same or substantially similar to the compositional properties of the semi-solid electrode material 330b described above, with reference to FIGS. 3A-3E. In some embodiments, the method 40 can include the use a roller to densify the semi-solid electrode material 430a, as described above, with reference to FIGS. 3A-3E.

In some embodiments, the first composition of the semi-solid electrode material 430a can include about 20% to about 80% by volume of an active material. In some embodiments the first composition of the semi-solid electrode material 430a can include about 40% to about 80% by volume, or 50% to about 80% by volume of an active material. In some embodiments, the first composition of the semi-solid electrode material 430a can include at least about 20%, at least about 25%, at least about 30%, at least about 35%, at least about 40%, at least about 45%, at least about 50%, at least about 55%, at least about 60%, at least about 65%, at least about 70%, or at least about 75% by volume of an active material. In some embodiments, the first composition of the semi-solid electrode material 430a can include no more than about 80%, no more than about 75%, no more than about 70%, no more than about 65%, no more than about 60%, no more than about 55%, no more than about 50%, no more than about 45%, no more than about 40%, no more than about 35%, no more than about 30%, or no more than about 25% by volume of an active material. Combinations of the above-referenced volume percentages of active material in the first composition of the semi-solid electrode material 430a are also possible (e.g., at least about 20% by volume and no more than about 80% by volume or at least about 30% by volume and no more than about 60% by volume), inclusive of all values and ranges therebetween. In some embodiments, the first composition of the semi-solid electrode material 430a can include about 20%, about 25%, about 30%, about 35%, about 40%, about 45%, about 50%, about 55%, about 60%, about 65%, about 70%, about 75%, or about 80% by volume of an active material.

In some embodiments, the first composition of the semi-solid electrode material 430a can include about 0.5% to about 25% by volume of a conductive material. In some embodiments, the first composition of the semi-solid electrode material 430a can include about 1.0% to about 6% by volume of a conductive material. In some embodiments, the first composition of the semi-solid electrode material 430a can include at least about 0.5%, at least about 1%, at least about 1.5%, at least about 2%, at least about 2.5%, at least about 3%, at least about 3.5%, at least about 4%, at least about 4.5%, at least about 5%, at least about 5.5%, at least about 6%, at least about 6.5%, at least about 7%, at least about 7.5%, at least about 8%, at least about 8.5%, at least about 9%, at least about 9.5%, at least about 10%, at least about 15%, or at least about 20% by volume of a conductive material. In some embodiments, the first composition of the semi-solid electrode material 430a can include no more than about 25%, no more than about 20%, no more than about 15%, no more than about 10%, no more than about 9.5%, no more than about 9%, no more than about 8.5%, no more than about 8%, no more than about 7.5%, no more than about 7%, no more than about 6.5%, no more than about 6%, no more than about 5.5%, no more than about 5%, no more than about 4.5%, no more than about 4%, no more than about 3.5%, no more than about 3%, no more than about 2.5%, no more than about 2%, no more than about 1.5%, or no more than about 1% by volume of a conductive material. Combinations of the above-referenced volume percentages of conductive material in the first composition of the semi-solid electrode material 430a are also possible (e.g., at least about 0.5% by volume and no more than about 25% by volume or at least about 3% by volume and no more than about 10% by volume), inclusive of all values and ranges therebetween. In some embodiments, the first composition of the semi-solid electrode material 430a can include about 0.5%, about 1%, about 1.5%, about 2%, about 2.5%, about 3%, about 3.5%, about 4%, about 4.5%, about 5%, about 5.5%, about 6%, about 6.5%, about 7%, about 7.5%, about 8%, about 8.5%, about 9%, about 9.5%, about 10%, about 15%, about 20%, or about 25% by volume of a conductive material.

In some embodiments, the first composition of the semi-solid electrode material 430a can include about 25% to about 70% by volume of an electrolyte. In some embodiments, the first composition of the semi-solid electrode material 430a can include about 30% to about 50%, or about 20% to about 40% by volume of an electrolyte. In some embodiments, the second composition of the semi-solid electrode material 430b can include at least about 30%, at least about 35%, at least about 40%, at least about 45%, at least about 50%, at least about 55%, at least about 60%, at least about 65%, at least about 70%, at least about 75%, or at least about 80% by volume of an active material. In some embodiments, the second composition of the semi-solid electrode material 430b can include no more than about 85%, no more than about 80%, no more than about 75%, no more than about 70%, no more than about 65%, no more than about 60%, no more than about 55%, no more than about 50%, no more than about 45%, no more than about 40%, or no more than about 35% by volume of an active material. Combinations of the above-referenced volume percentages of active material in the second composition of the semi-solid electrode material 430b are also possible (e.g., at least about 30% by volume and no more than about 85% by volume or at least about 40% by volume and no more than about 70% by volume), inclusive of all values and ranges therebetween. In some embodiments, the second composition of the semi-solid electrode material 430b can include about 30%, about 35%, about 40%, about 45%, about 50%, about 55%, about 60%, about 65%, about 70%, about 75%, about 80%, or about 85% by volume of an active material.

In some embodiments, the second composition of the semi-solid electrode wafer 430b can include about 30% to about 85% by volume of an active material. In some embodiments the second composition of the semi-solid electrode wafer 430b can include about 50% to about 85% by volume, or 60% to about 85% by volume of an active material. In some embodiments, the second composition of the semi-solid electrode material 430b can include at least about 30%, at least about 35%, at least about 40%, at least about 45%, at least about 50%, at least about 55%, at least about 60%, at least about 65%, at least about 70%, at least about 75%, or at least about 80% by volume of an active material. In some embodiments, the second composition of the semi-solid electrode material 430b can include no more than about 85%, no more than about 80%, no more than about 75%, no more than about 70%, no more than about 65%, no more than about 60%, no more than about 55%, no more than about 50%, no more than about 45%, no more than about 40%, or no more than about 35% by volume of an active material. Combinations of the above-referenced volume percentages of active material in the second composition of the semi-solid electrode material 430b are also possible (e.g., at least about 30% by volume and no more than about 85% by volume or at least about 40% by volume and no more than about 70% by volume), inclusive of all values and ranges therebetween. In some embodiments, the second composition of the semi-solid electrode material 430b can include about 30%, about 35%, about 40%, about 45%, about 50%, about 55%, about 60%, about 65%, about 70%, about 75%, about 80%, or about 85% by volume of an active material.

In some embodiments, the second composition of the semi-solid electrode wafer 430b can include about 0.5% to about 30% by volume of a conductive material. In some embodiments, the second composition of the semi-solid electrode wafer 430b can include about 1.0% to about 6% by volume of a conductive material. In some embodiments, the second composition of the semi-solid electrode material 430b can include at least about 0.5%, at least about 1%, at least about 1.5%, at least about 2%, at least about 2.5%, at least about 3%, at least about 3.5%, at least about 4%, at least about 4.5%, at least about 5%, at least about 5.5%, at least about 6%, at least about 6.5%, at least about 7%, at least about 7.5%, at least about 8%, at least about 8.5%, at least about 9%, at least about 9.5%, at least about 10%, at least about 15%, at least about 20%, or at least about 25% by volume of a conductive material. In some embodiments, the second composition of the semi-solid electrode material 430b can include no more than about 30%, no more than about 25%, no more than about 20%, no more than about 15%, no more than about 10%, no more than about 9.5%, no more than about 9%, no more than about 8.5%, no more than about 8%, no more than about 7.5%, no more than about 7%, no more than about 6.5%, no more than about 6%, no more than about 5.5%, no more than about 5%, no more than about 4.5%, no more than about 4%, no more than about 3.5%, no more than about 3%, no more than about 2.5%, no more than about 2%, no more than about 1.5%, or no more than about 1% by volume of a conductive material. Combinations of the above-referenced volume percentages of conductive material in the second composition of the semi-solid electrode material 430b are also possible (e.g., at least about 0.5% by volume and no more than about 30% by volume or at least about 5% by volume and no more than about 10% by volume), inclusive of all values and ranges therebetween. In some embodiments, the second composition of the semi-solid electrode material 430b can include about 0.5%, about 1%, about 1.5%, about 2%, about 2.5%, about 3%, about 3.5%, about 4%, about 4.5%, about 5%, about 5.5%, about 6%, about 6.5%, about 7%, about 7.5%, about 8%, about 8.5%, about 9%, about 9.5%, about 10%, about 15%, about 20%, about 25%, or about 30% by volume of a conductive material.

In some embodiments, the second composition of the semi-solid electrode wafer 430b can include about 15% to about 60% by volume of an electrolyte. In some embodiments, the second composition of the semi-solid electrode wafer 430b can include about 20% to about 40%, or about 10% to about 30% by volume of an electrolyte. In some embodiments, the second composition of the semi-solid electrode material 430b can include at least about 15%, at least about 20%, at least about 25%, at least about 30%, at least about 35%, at least about 40%, at least about 45%, at least about 50%, or at least about 55% by volume of an electrolyte. In some embodiments, the second composition of the semi-solid electrode material 430b can be no more than about 60%, no more than about 55%, no more than about 50%, no more than about 45%, no more than about 40%, no more than about 35%, no more than about 30%, no more than about 25%, or no more than about 20% by volume of an electrolyte. Combinations of the above-referenced volume percentages of electrolyte in the second composition of the semi-solid electrode material 430b are also possible (e.g., at least about 15% and no more than about 60% or at least about 20% and no more than about 40%), inclusive of all values and ranges therebetween. In some embodiments, the second composition of the semi-solid electrode material 430b can include about 15%, about 20%, about 25%, about 30%, about 35%, about 40%, about 45%, about 50%, about 55%, or about 60% by volume of an electrolyte.

In some embodiments, the second composition of the semi-solid electrode material 330b can have a ratio of electrolyte to active material less than the first composition of the semi-solid electrode material 430a. In some embodiments, the second composition of the semi-solid electrode wafer 430b can have a ratio of electrolyte to active material between about 5:1 and about 1:3, about 4:1 and about 1:2, about 3:1 and about 1:1, about 5:1 and about 1:2, about 5:1 and about 1:1, about 5:1 and about 2:1, about 5:1 and about 3:1, about 5:1 and about 4:1, about 4:1 and about 1:3, about 3:1 and about 1:3, about 2:1 and about 1:3, about 1:1 and about 1:3, or about 1:2 and about 1:3, inclusive of all values and ranges therebetween.

Figure 4F:
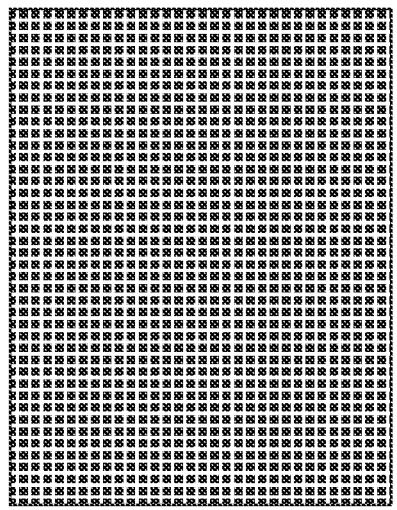

FIG. 4F is a top view of the semi-solid electrode wafer 430*b*. As shown, the semi-solid electrode wafer 430*b* has a rectangular shape when viewing from the top. In some embodiments, the semi-solid electrode wafer 430*b* can have a round shape, an L-shape, a square shape, or any other suitable shape for incorporation into an electrochemical cell, when the semi-solid electrode wafer 430*b* is viewed from the top. Accordingly, in some embodiments the cavity 439 can have a rectangular shape, a round shape, an L-shape, a square shape, or any other suitable shape for the production of an electrode, when the cavity 439 is viewed from the top.

In some embodiments, the weight and/or thickness of the semi-solid electrode can be measured at various points throughout the process of mechanically pressing the intermediate electrode to form the finished electrode. For example, in some embodiments, the weight of the finished electrode can be a second weight and can be compared to the first weight to determine the mass of the electrolyte that was removed during mechanically pressing. In some embodiments, the thickness of the finished electrode can be a second thickness and can be compared to the first thickness to determine the volume of the electrolyte that was removed during mechanically pressing. In some embodiments, if the difference between the first and second weight or the first and second thickness of the semi-solid electrode wafer 430*b* is not sufficient, an absorptive material 440 and/or semi-permeable membrane can be disposed back onto the semi-solid electrode and the intermediate electrode can be further mechanically compressed to remove a second portion of electrolyte from the semi-solid electrode wafer 430*b*. In some embodiments, the volume or mass of electrolyte removed during mechanically pressing can be used to determine the relative volume or mass percentages of the active material, conductive material, and electrolyte in the semi-solid electrode wafer 430*b*.

In some embodiments, once the composition of the semi-solid electrode wafer 430*b* matches or substantially matches the desired composition of the semi-solid electrode wafer 430*b* in the finished electrode, the electrode can be removed from the mechanical press. In some embodiments, the electrode can be weighed before being mechanically pressed, can then be mechanically pressed for a first time period to remove a first portion of the electrolyte, and then weighed again, the difference between the first weight and the second weight operable to determine the mass of electrolyte removed. If the mass of electrolyte removed corresponds sufficiently with the desired volume or mass of electrolyte to be removed, then the electrode can be considered a finished electrode and is ready for further processing or incorporation into an electrochemical cell (not shown). If the mass of electrolyte removed does not correspond sufficiently with the desired volume or mass of electrolyte to be removed, then the electrode can be mechanically pressed for a second time period to remove a second portion of the electrolyte, and then weighed a third time, the different between the second weight and the third weight operable to determine the mass of electrolyte removed during the second time period. If the mass of electrolyte removed during the first time period plus the mass of electrolyte removed during the second time period equals or substantially equals the desired mass of electrolyte to be removed from the semi-solid electrode material, then the electrode can be considered a finished electrode. Mechanical compression of the intermediate electrode can continue in this iterative manner until the total volume or mass of electrolyte removed equals or substantially equals the desired volume or mass of electrolyte to be removed.

FIGS. 5A and 5B illustrate a method 50 of additional use of the aforementioned semi-solid electrode wafer 430*b*, according to an embodiment. In some embodiments, the semi-solid electrode wafer 430*b* can be used to form an electrochemical cell, the electrochemical cell including a second electrode 470, a current collector 472, and a separator 474. As shown in 51, the second electrode 470 is disposed on the current collector 472, and the separator 474 is disposed on the second electrode 470. In some embodiments, electrolyte droplets 476 can be placed on the separator 474 to wet the surface of the separator 474. At 52, the semi-solid electrode wafer 430*b* is disposed on the separator 474. Wetting the surface of the separator 474 can prevent void space along the interface between the semi-solid electrode wafer 430*b* and the separator 474. The void spaces are filled by the electrolyte droplets 476 and there are substantially no areas at the interface between the semi-solid electrode wafer 430*b* and the separator 474 that prevent ionic movement.

In some embodiments, the semi-solid electrode wafer 430*b* can be easily transported. In some embodiments, multiple semi-solid electrode wafers 430*b* can be stacked together. In some embodiments, the semi-solid electrode wafer 430*b* can be stacked on other electrodes. In some embodiments, multiple semi-solid electrode wafers 430*b* with varying cell chemistries can be stacked together. In other words a first semi-solid electrode wafer can have a first cell chemistry and a second semi-solid electrode wafer can have a second cell chemistry, wherein the second cell chemistry is different from the first cell chemistry. In some embodiments, additional semi-solid electrode wafers can have additional chemistries. In some embodiments, the semi-solid electrode wafer 430*b* can be included into a bi-cell, or an electrochemical cell system with multiple battery chemistries.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method of forming a densified semi-solid electrode, the method comprising:
   mixing an active material and a conductive material with a liquid electrolyte to form a semi-solid electrode material;
   disposing the semi-solid electrode material onto a current collector;
   disposing a semi-permeable membrane onto an exposed surface of the semi-solid electrode material; and
   compressing the semi-solid electrode material between the current collector and the semi-permeable membrane to extract a portion of the liquid electrolyte and form the densified semi-solid electrode,
   wherein the densified semi-solid electrode includes between about 60% and about 85% by volume of an active material.

2. The method of claim 1, wherein the semi-permeable membrane is configured to absorb the portion of the liquid electrolyte extracted during compressing.

3. The method of claim 1, further comprising:
disposing an absorptive material onto an exposed surface of the semi-permeable membrane, the absorptive material configured to absorb the portion of the liquid electrolyte extracted during compressing.

4. The method of claim 1, wherein mechanically compressing the semi-solid electrode material includes compressing the semi-solid material between a die and a base.

5. The method of claim 1, wherein the compressed semi-solid electrode material includes greater than about 70 wt % of the active material.

6. The method of claim 1, wherein the semi-solid electrode material after mixing has a first composition in which the liquid electrolyte is between about 50 wt % and about 80 wt % of the semi-solid electrode material, and
wherein the semi-solid electrode material after compressing has a second composition in which the liquid electrolyte is between about 10 wt % and about 45 wt % of the semi-solid electrode material.

7. The method of claim 1, wherein the semi-solid electrode material after mixing has a first ratio of liquid electrolyte to active material of between about 10:1 and about 1:1; and
wherein the semi-solid electrode material after compressing has a second ratio of liquid electrolyte to active material of between about 5:1 and about 1:3.

8. The method of claim 1, wherein the semi-solid electrode material after mixing has a first active material molarity of between about 5M and about 15M; and
wherein the semi-solid electrode material after compressing has a second active material molarity of between about 16M and about 24M.

9. The method of claim 1, wherein the semi-solid electrode material after mixing has a first energy density of between about 3 mAh/g and about 5 mAh/g; and
wherein the semi-solid electrode material after compressing has a second energy density of between about 6 mAh/g and about 14 mAh/g.

10. The method of claim 1, wherein the conductive material includes conductive particles.

11. The method of claim 1, wherein the densified semi-solid electrode is a first electrode and the current collector is a first current collector, further comprising:
removing the semi-permeable membrane from the first electrode;
placing a second electrode on a second current collector;
placing a separator on the second electrode, such that a first surface of the separator contacts the second electrode and a second surface of the separator is exposed, the second surface opposite the first surface;
placing droplets of electrolyte on the second surface of the separator; and
placing the first electrode on the separator to form an electrochemical cell.

12. A method, comprising:
mixing an active material and a conductive material with a liquid electrolyte to form a semi-solid electrode material having a first volume;
interposing the semi-solid electrode material between a current collector and a semi-permeable membrane; and
applying a compressive force to the semi-solid electrode material via a roller such that the semi-solid electrode material has a second volume less than the first volume.

13. The method of claim 12, further comprising:
exposing the semi-solid electrode material to an absorptive material, such that a portion of the liquid electrolyte migrates from the semi-solid electrode material to the absorptive material.

14. The method of claim 13, wherein the absorptive material is conveyed by one or more rollers.

15. The method of claim 14, wherein a flat portion of the absorptive material is in contact with the semi-solid electrode material.

16. The method of claim 12, wherein the second volume is between about 50% and about 95% of the first volume.

17. The method of claim 16, wherein the second volume is between about 50% and about 80% of the first volume.

18. The method of claim 16, wherein the second volume is between about 70% and about 95% of the first volume.

19. A method, comprising:
mixing an active material and a conductive material with a liquid electrolyte to form a semi-solid electrode material having a first thickness;
interposing the semi-solid electrode material between a current collector and a semi-permeable membrane; and
applying a compressive force to the semi-solid electrode material via a roller such that the semi-solid electrode material has a second thickness less than the first thickness.

20. The method of claim 19, wherein the first thickness is between about 100 µm and about 2,000 µm.

21. The method of claim 19, wherein the second thickness is between about 5 µm and about 50 µm.

22. The method of claim 19, wherein mechanically compressing is accomplished by mechanically compressing the semi-solid electrode material between a base and a die of a mechanical press.

23. A method, comprising:
mixing an active material and a conductive material with a liquid electrolyte to form a first semi-solid electrode material having a first composition comprising between about 50 wt % and about 80 wt % of the liquid electrolyte;
interposing the first semi-solid electrode material between a current collector and a semi-permeable membrane; and
mechanically compressing the first semi-solid electrode material to form a second semi-solid electrode material having a second composition comprising between about 10 wt % and about 45 wt % of the liquid electrolyte.

24. A method, comprising:
mixing an active material and a conductive material with a liquid electrolyte to form a first semi-solid electrode material having a first density;
interposing the first semi-solid electrode material between a current collector and a semi-permeable membrane; and
mechanically compressing the first semi-solid electrode material to form a second semi-solid electrode material having a second density greater than the first density, the second semi-solid electrode material including between about 60% and about 85% by volume of the active material.

25. The method of claim 24, wherein the first density is less than about 2 g/cm$^3$.

26. The method of claim 25, wherein the second density is between about 2.1 g/cm$^3$ and about 4 g/cm$^3$.

27. The method of claim 26, wherein an energy density of the second semi-solid electrode material is greater than about 7 mAh/g.

28. The method of claim 27, wherein the energy density of the second semi-solid electrode material is greater than about 8 mAh/g.

29. The method of claim 28, wherein the energy density of the second semi-solid electrode material is greater than about 9 mAh/g.

30. The method of claim 29, wherein the energy density of the second semi-solid electrode material is greater than about 10 mAh/g.

* * * * *